United States Patent
Iskander

(10) Patent No.: US 9,886,179 B2
(45) Date of Patent: Feb. 6, 2018

(54) ANCHORED APPROACH TO SCROLLING

(71) Applicant: Apple Inc., Cupertino, CA (US)

(72) Inventor: Alexis Allison Iskander, San Jose, CA (US)

(73) Assignee: Apple Inc., Cupertino, CA (US)

(*) Notice: Subject to any disclaimer, the term of this patent is extended or adjusted under 35 U.S.C. 154(b) by 215 days.

(21) Appl. No.: 14/503,041

(22) Filed: Sep. 30, 2014

(65) Prior Publication Data

US 2016/0065505 A1 Mar. 3, 2016

Related U.S. Application Data

(60) Provisional application No. 62/042,779, filed on Aug. 27, 2014.

(51) Int. Cl.
| | |
|---|---|
| *G06F 3/048* | (2013.01) |
| *G06F 3/0485* | (2013.01) |
| *G06F 3/0488* | (2013.01) |
| *H04L 12/58* | (2006.01) |

(52) U.S. Cl.
CPC .......... *G06F 3/0485* (2013.01); *G06F 3/0488* (2013.01); *H04L 51/22* (2013.01); *G06F 2200/1614* (2013.01); *G06F 2203/04803* (2013.01); *G06F 2203/04808* (2013.01)

(58) Field of Classification Search
CPC ... G06F 3/041–3/0416; G06F 3/048–3/04886; G06F 2203/04808
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |

(Continued)

OTHER PUBLICATIONS

Lemay et al., U.S. Appl. No. 60/936,562, filed Jun. 20, 2007, titled "Portable Multifunction Device, Method, and Graphical User Interface for Playing Online Videos", 61 pages.

(Continued)

*Primary Examiner* — Claudia Dragoescu
(74) *Attorney, Agent, or Firm* — Dentons US LLP

(57) ABSTRACT

At an electronic device having access to a plurality of data objects: displaying a viewport comprising graphical representations of a first subset of the plurality of data objects that are ordered. While displaying the graphical representations of the first subset, the device receives a request to navigate through graphical representations of the plurality of data objects in the viewport. The request is associated with an input magnitude. In response to the request: generate a layout for a second subset of the plurality of data objects based on the input magnitude and an anchor within the plurality of data objects that was selected based on user input; and changing the content of the viewport by displaying graphical representations of the data objects of the second subset according to the layout.

54 Claims, 21 Drawing Sheets

(56) References Cited

U.S. PATENT DOCUMENTS

| | | |
|---|---|---|
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0197753 A1 | 9/2006 | Hotelling |
| 2008/0320391 A1 | 12/2008 | Lemay et al. |
| 2011/0145737 A1* | 6/2011 | Laugwitz .............. G06F 3/0482 715/763 |
| 2012/0110499 A1* | 5/2012 | Hance .................. G06F 9/4445 715/781 |
| 2012/0299933 A1 | 11/2012 | Lau et al. |
| 2014/0101609 A1* | 4/2014 | Bamford .............. G06F 3/0484 715/810 |
| 2014/0250371 A1* | 9/2014 | Wabyick ................ G06F 17/21 715/243 |
| 2016/0062584 A1 | 3/2016 | Cohen et al. |

OTHER PUBLICATIONS

Non-Final Office Action Received for U.S. Appl. No. 14/502,975, mailed on Sep. 16, 2016, 19 pages.

* cited by examiner

ANCHORED APPROACH TO SCROLLING

CROSS-REFERENCE TO RELATED APPLICATION

This application claims the benefit of U.S. Provisional Application Ser. No. 62/042,779, filed on Aug. 27, 2014, the entire content of which is incorporated by reference for all purposes.

BACKGROUND

1. Field

This application relates generally to displaying multiple graphical objects on a display, and, more specifically, to techniques for configuring layouts of graphical objects in response to user navigation.

2. Description of Related Art

Modern computing devices can display multiple graphical objects on-screen. These graphical objects may represent file system objects such as files and folders. These graphical objects also may represent applications-specific objects such as e-mail and text messages. The display of graphical objects may be affected by user input, such as input to navigate a viewport. The display of graphical objects may also be affected by background processes that are obtaining or deleting underlying data objects (e.g., files and messages) that are represented on-screen.

A device may take into consideration a variety of factors and conditions in determining what updates should be made to a displayed set of graphical objects in response to the user input and/or background processes. As these inputs and processes can occur frequently, a device's ability to update displayed information quickly and consistently with user expectations has a significant effect on the quality of overall usability of displayed content and user experience.

BRIEF SUMMARY

In some embodiments, a method of updating a user interface window at an electronic device configured to access a plurality of data objects comprises: displaying a viewport comprising graphical representations of a first subset of the plurality of data objects that are ordered; while displaying the graphical representations of the first subset, receiving a request to navigate through graphical representations of the plurality of data objects in the viewport, where the request is associated with an input magnitude. In response to the request, generating a layout for a second subset of the plurality of data objects based on the input magnitude and an anchor within the plurality of data objects that was selected based on user input; and changing the content of the viewport by displaying graphical representations of the data objects of the second subset according to the layout.

In some embodiments, a system configured to access a plurality of data objects and display graphical representations of subsets of the plurality of data objects comprises: means for displaying a viewport comprising graphical representations of a first subset of the plurality of data objects that are ordered; means for, while displaying the graphical representations of the first subset, receiving a request to navigate through graphical representations of the plurality of data objects in the viewport, where the request is associated with an input magnitude. Means responsive to the request, for generating a layout for a second subset of the plurality of data objects based on the input magnitude and an anchor within the plurality of data objects that was selected based on user input; and means for changing the content of the viewport by displaying graphical representations of the data objects of the second subset according to the layout.

DESCRIPTION OF THE FIGURES

For a better understanding of the various described embodiments, reference should be made to the Detailed Description of embodiments below, in conjunction with the following drawings in which like reference numerals refer to corresponding parts throughout the figures.

DETAILED DESCRIPTION

The following description sets forth exemplary methods, parameters and the like. It should be recognized, however, that such description is not intended as a limitation on the scope of the present disclosure but is instead provided as a description of exemplary embodiments.

Figure 6A:
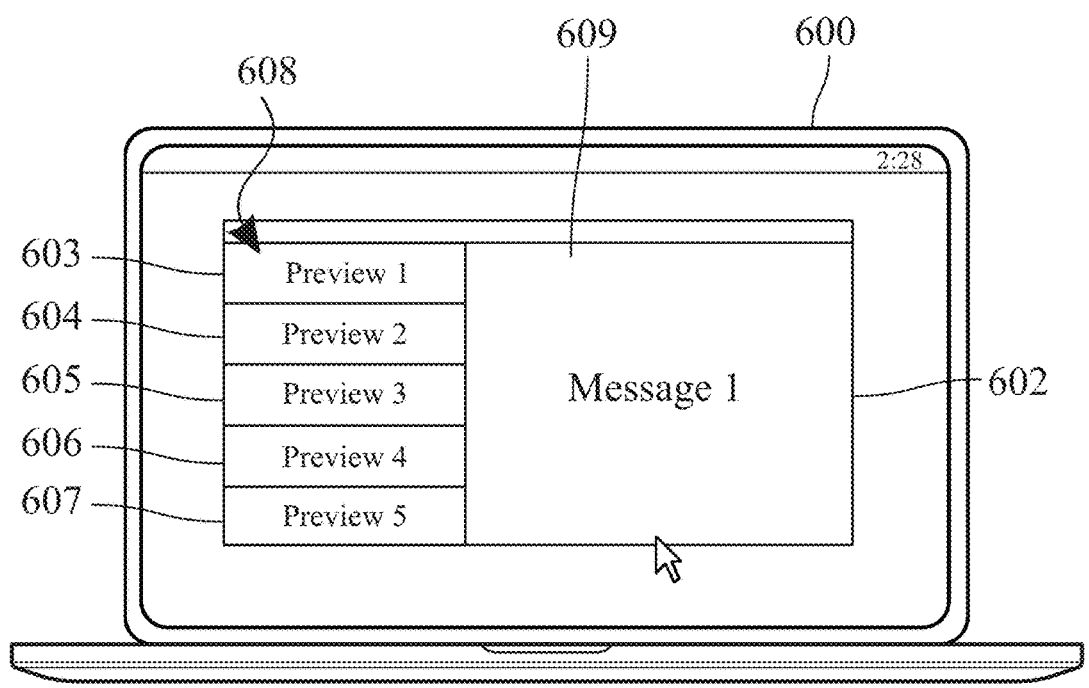
FIGS. 6A-6H illustrate an exemplary embodiment of techniques for configuring the layout of graphical representations of data objects, in response to user input.

FIG. 6A depicts an implementation of embodiments of the techniques described herein for laying out graphical representations of data objects. As shown, laptop 600 is executing an active e-mail application that causes the display of application window 602. Window 602 has a viewport 608 for displaying e-mail message previews 603-607. A message preview may include an identification of the message's sender, a subject line, and the initial line(s) of the e-mail message. Window 602 also has a region 609 for displaying the body of a selected e-mail message, in this case the e-mail message represented by preview region 603.

In some circumstances, a user may wish to change the content displayed within window 602 or viewport 608. For example, a user may scroll preview viewport 608 intending to reveal other messages for display. When this occurs, it would be helpful for device 600 to update preview viewport

608 smoothly (e.g., quickly) and consistently with the user's scrolling input. In some circumstances, a user may wish for the displayed content to remain steady. For example, if the user is viewing preview viewport 608 and not providing navigation input, it would be helpful for device 600 to maintain the content of viewport 608, even if new e-mail messages are incoming.

Below, FIGS. 1A-1B, 2, 3, 4, 5, and 9 provide a description of exemplary devices that may perform techniques for controlling the display layout of graphical representations of data objects. FIGS. 6B-6H and 7A-7J illustrate exemplary aspects of these techniques. The figures are also used to illustrate the processes described below, including the processes in FIG. 8.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
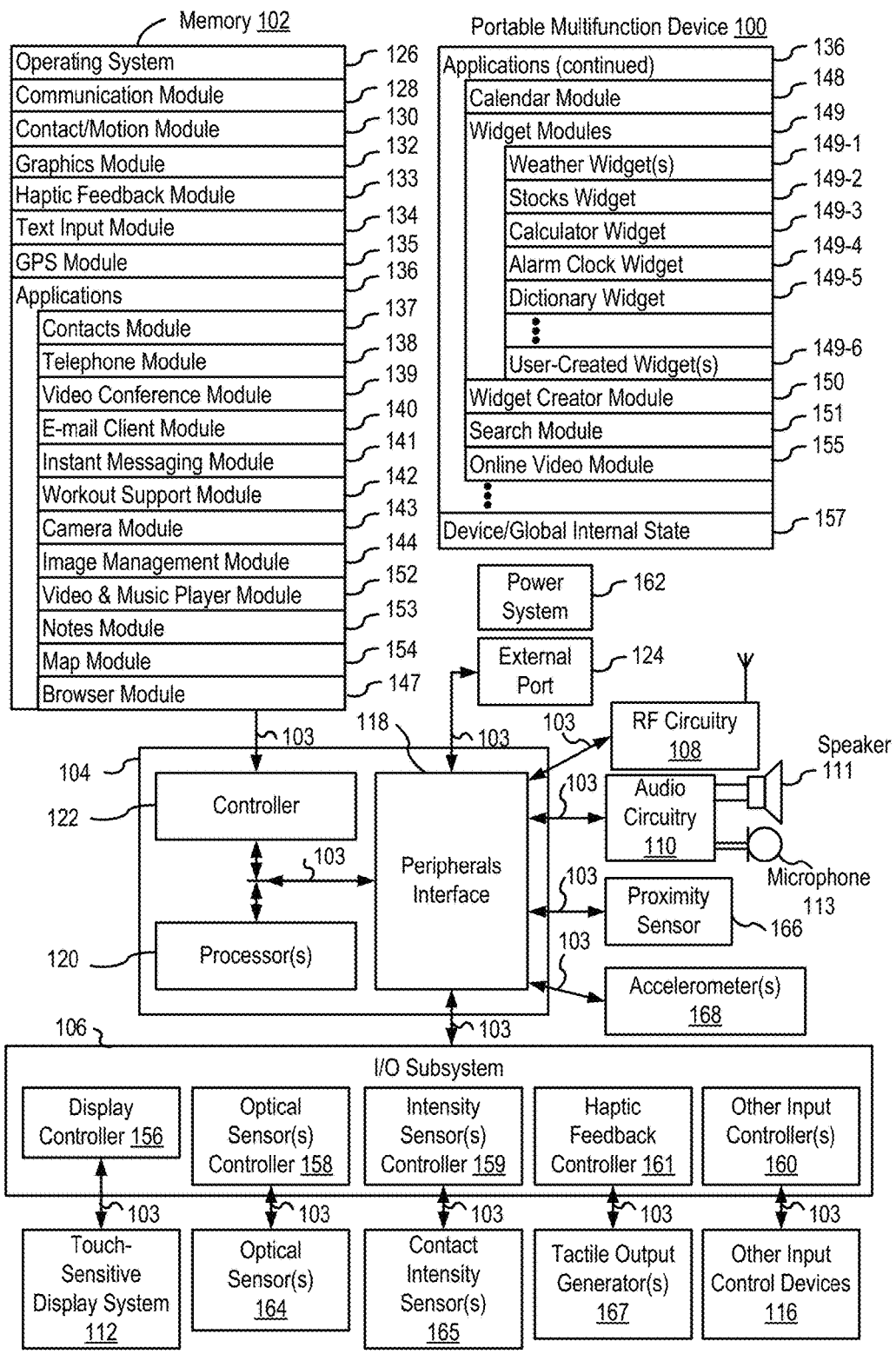
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100.

Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
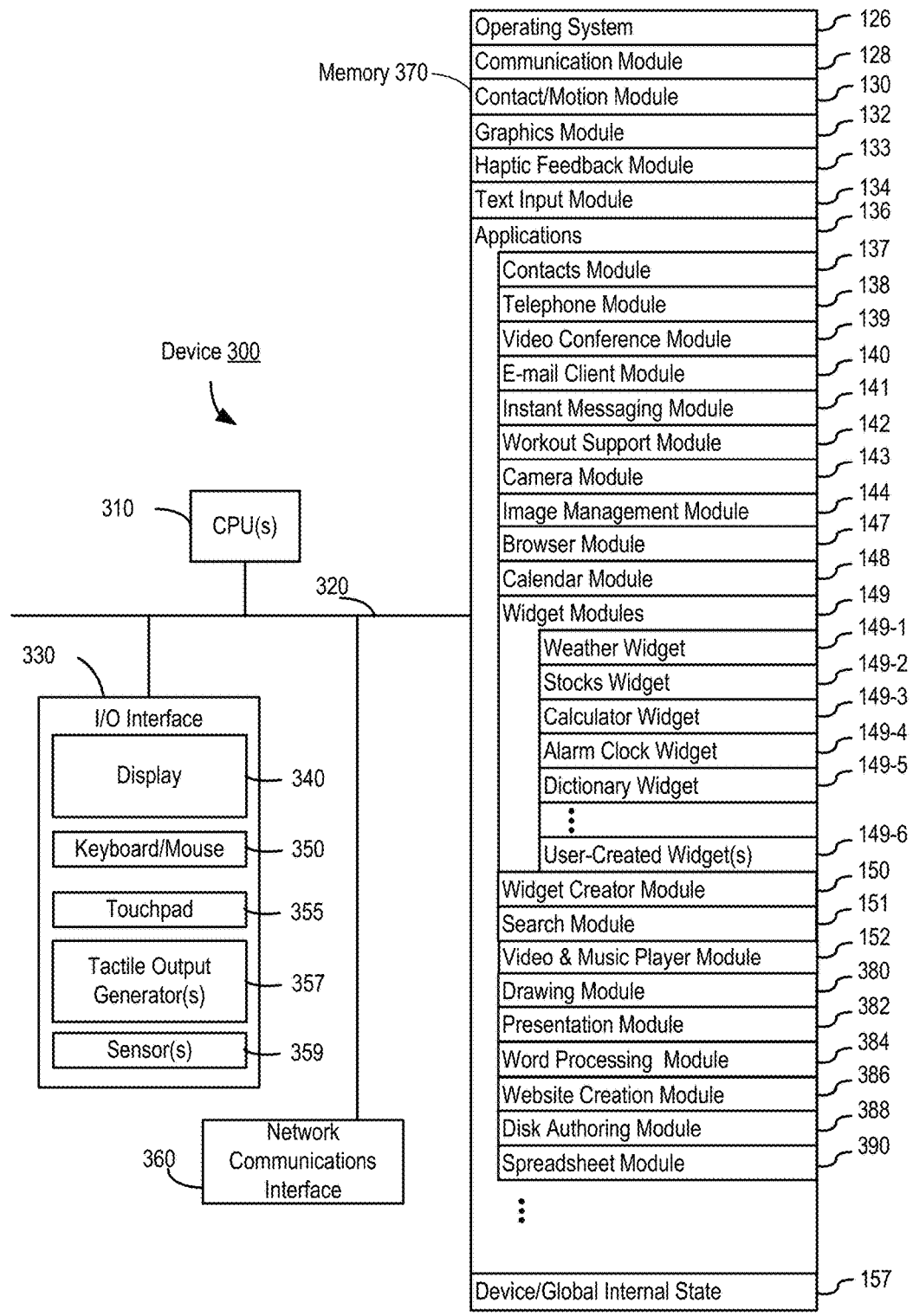
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conferencing module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
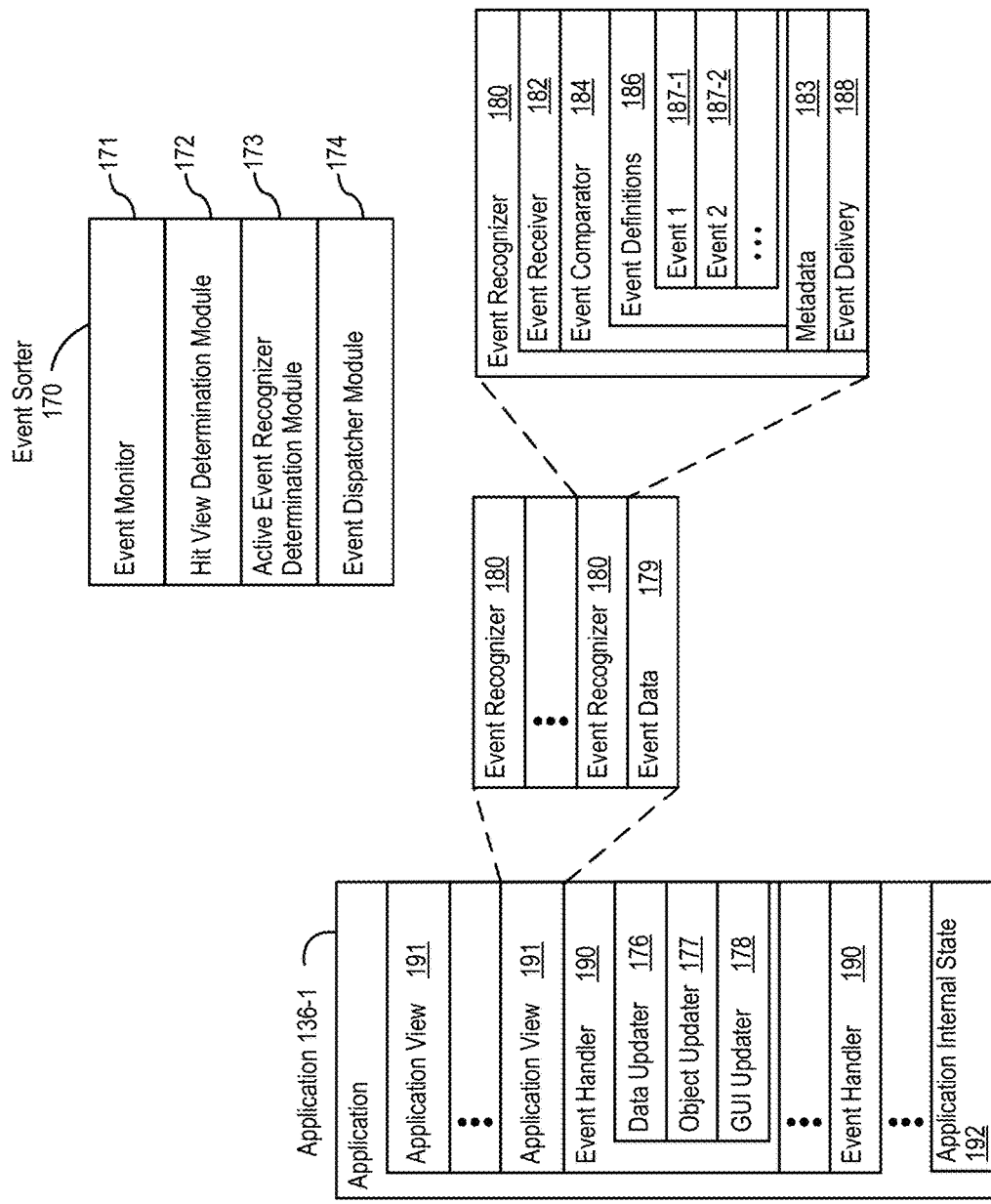
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
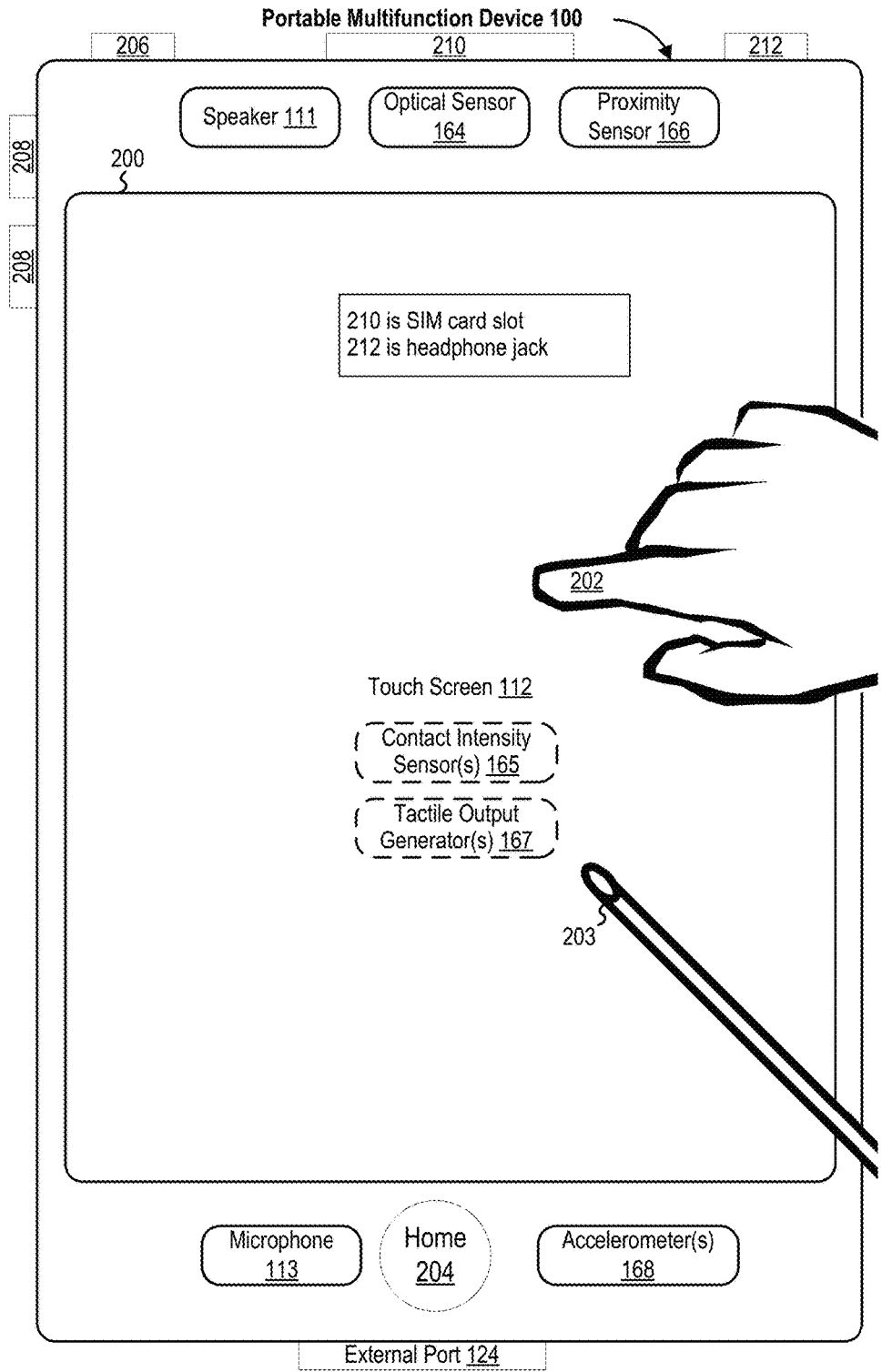
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4:
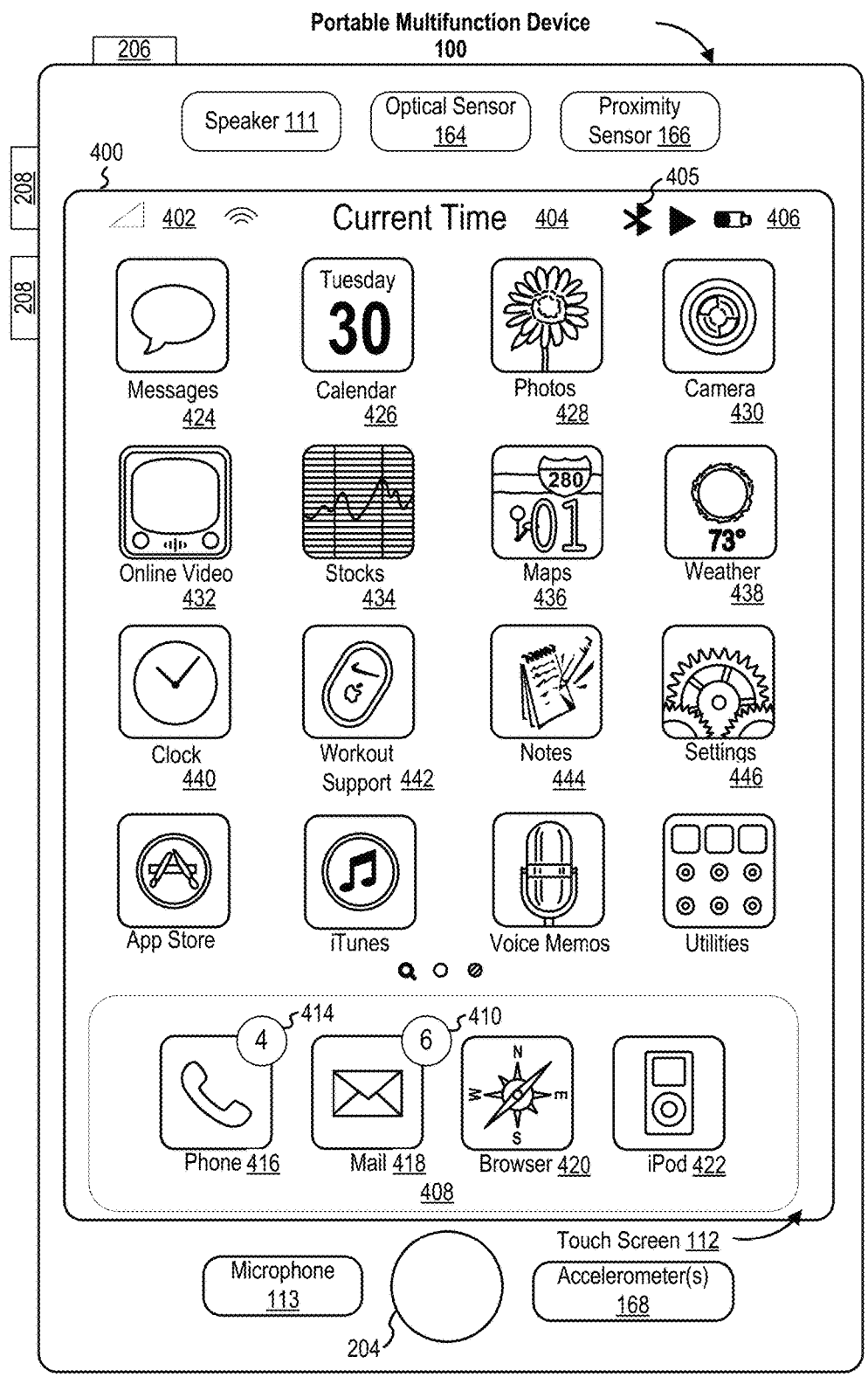
FIG. 4 illustrates an exemplary user interface for a menu of applications on a portable multifunction device in accordance with some embodiments.

FIG. 4 illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4 are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5:
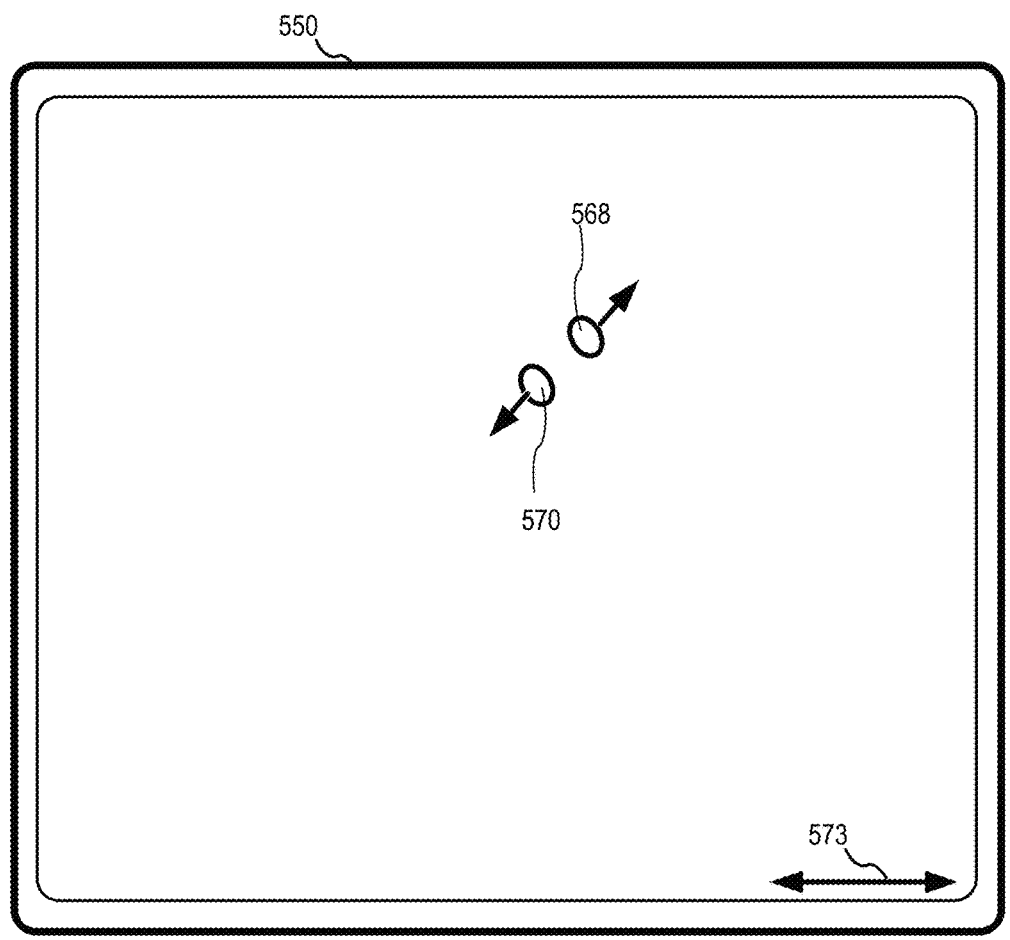
FIG. 5 illustrates an exemplary user interface for a multifunction device with a touch-sensitive surface that is separate from the display in accordance with some embodiments.
Figure 5:
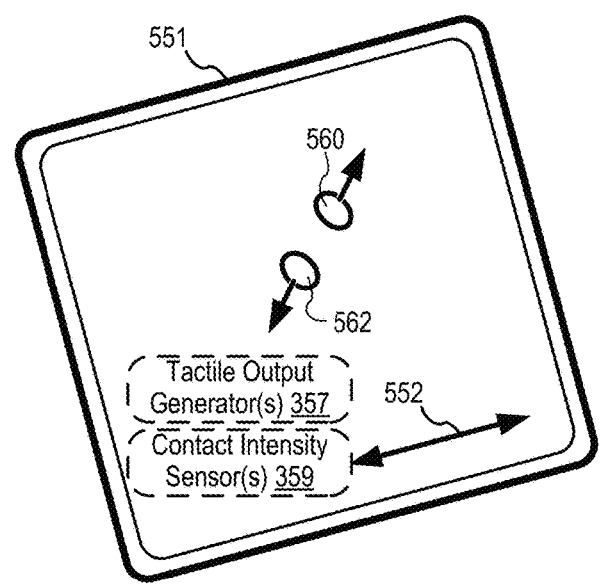

FIG. 5 illustrates an exemplary user interface on a device (e.g., device 300, FIG. 3) with a touch-sensitive surface 551 (e.g., a tablet or touchpad 355, FIG. 3) that is separate from the display 550 (e.g., touch screen display 112). Device 300 also, optionally, includes one or more contact intensity sensors (e.g., one or more of sensors 357) for detecting intensity of contacts on touch-sensitive surface 551 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 5. In some embodiments the touch sensitive surface (e.g., 551 in FIG. 5) has a primary axis (e.g., 552 in FIG. 5) that corresponds to a primary axis (e.g., 553 in FIG. 5) on the display (e.g., 550). In accordance with these embodiments, the device detects contacts (e.g., 560 and 562 in FIG. 5) with the touch-sensitive surface 551 at locations that correspond to respective locations on the display (e.g., in FIG. 5, 560 corresponds to 568 and 562 corresponds to 570). In this way, user inputs (e.g., contacts 560 and 562, and movements thereof) detected by the device on the touch-sensitive surface (e.g., 551 in FIG. 5) are used by the device to manipulate the user interface on the display (e.g., 550 in FIG. 5) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that may be displayed on the display screen of device 100 and/or 300 (FIGS. 1 and 3). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 551 in FIG. 5) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used herein, an "installed application" refers to a software application that has been downloaded onto an electronic device (e.g., devices 100 and/or 300) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed to towards user interfaces ("UI") and associated processes that may be implemented on a multifunction device with a display and a touch-sensitive surface, such as devices 100 and/or 300 (FIGS. 1A and 3A), to provide displays of graphical representations of data objects. These techniques may be collectively referred to as an "anchored" approach to updating a viewport.

1. Exemplary Layouts of Data Objects

FIGS. 6B-6L describe an exemplary technique for laying out graphical representations of data objects in response to user input. Exemplary application window 610, illustrated in FIG. 6B, may be window 602 (FIG. 6A) in some embodiments, meaning that window 610 may be part of an e-mail application. Window 610 has viewport 612 having content in the form of message preview regions 613-617. Window 610 also has region 619 where the body of a selected e-mail message is displayed. An e-mail message may become selected via touch or mouse input on a message preview region of viewport 612.

Figure 6B:
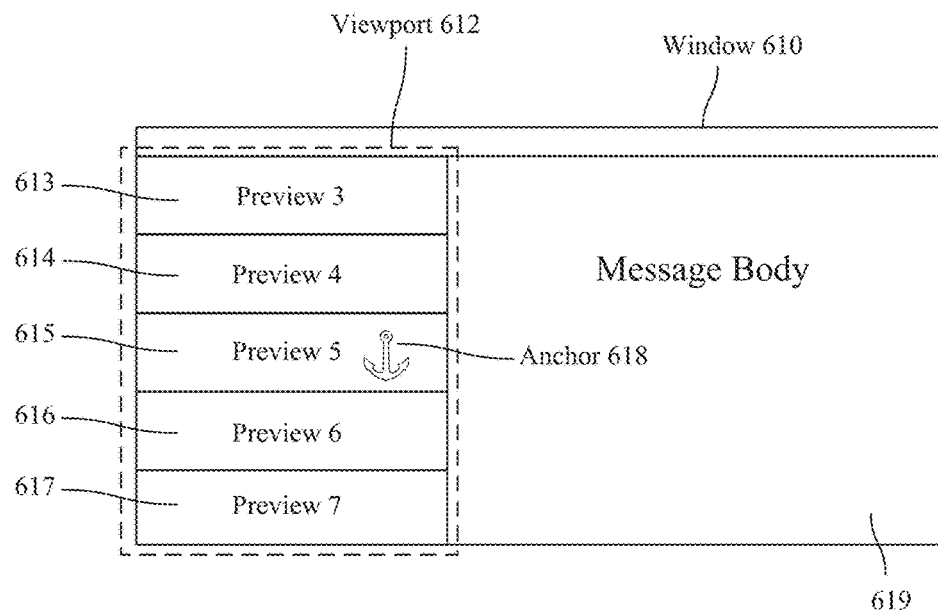
Figure 6C:
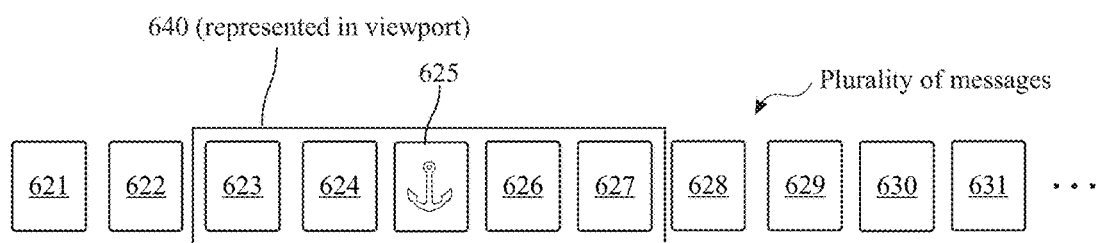

As viewport 612 is scrollable, the number of underlying e-mail messages that can be previewed through viewport 612 exceeds the five exemplary preview regions 613-617 depicted in FIG. 6B. FIG. 6C illustrates exemplary e-mail messages 621-631 that may be accessed via window 610 (FIG. 6B). Although the number of e-mail messages 621-631 depicted in FIG. 6B is limited, it should be noted that window 610 can support the display of more than the illustrated e-mail messages, which is being limited for clarity and brevity. Indeed, it is when a large number of email messages is being dealt with that the techniques describe herein provide the greatest benefit in terms of efficiency and control, thereby creating a more efficient machine-user interface and consequently reducing the energy used by the device and increasing battery life for battery powered devices.

In FIG. 6C, rectangle 640 is used to indicate the messages (623-627) being previewed in viewport 612 (FIG. 6B). Specifically, preview 613 (FIG. 6B) is displaying a preview of e-mail message 623, and preview 617 (FIG. 6B) is displaying a preview of message 627. For purposes of illustration, if content in viewport 612 is scrolled, the positioning of rectangle 640 with respect to underling messages 621-631 changes correspondingly.

Turning back to FIG. 6B, preview 615 can be seen as being associated with anchor 618. Anchor 618 need not be displayed on-screen, and is preferably hidden from on-screen display. Rather, anchor 618 represents an indication that the display element the user is most likely focused on, in this case preview region 615 corresponding to underlying message 625. The relationship between anchor 618 and message 625 is similarly depicted in FIG. 6C. The association of an anchor to a preview region (and a corresponding underlying message) can be tracked using data (e.g., program data or other meta-data) maintained by viewport 612, window 610, the underlying e-mail application, and/or other processes running on device 600.

In some embodiments, anchor 618 is set based on a user interaction. For example, a user selection (e.g., touch) of preview region 615 causes preview region 615 to become associated with an anchor. In some embodiments, anchor 618 is set by an upstream computing process. For example, anchor information provided by an earlier process can be obtained from a memory location. In some embodiments, anchor 618 is set through defaulting rules. For example, when viewport 612 is initially displayed, an anchor is assigned by default to the middle or top preview region. In some embodiments, a combination of these anchor setting processes is used, as they are not mutually exclusive.

Figure 6D:
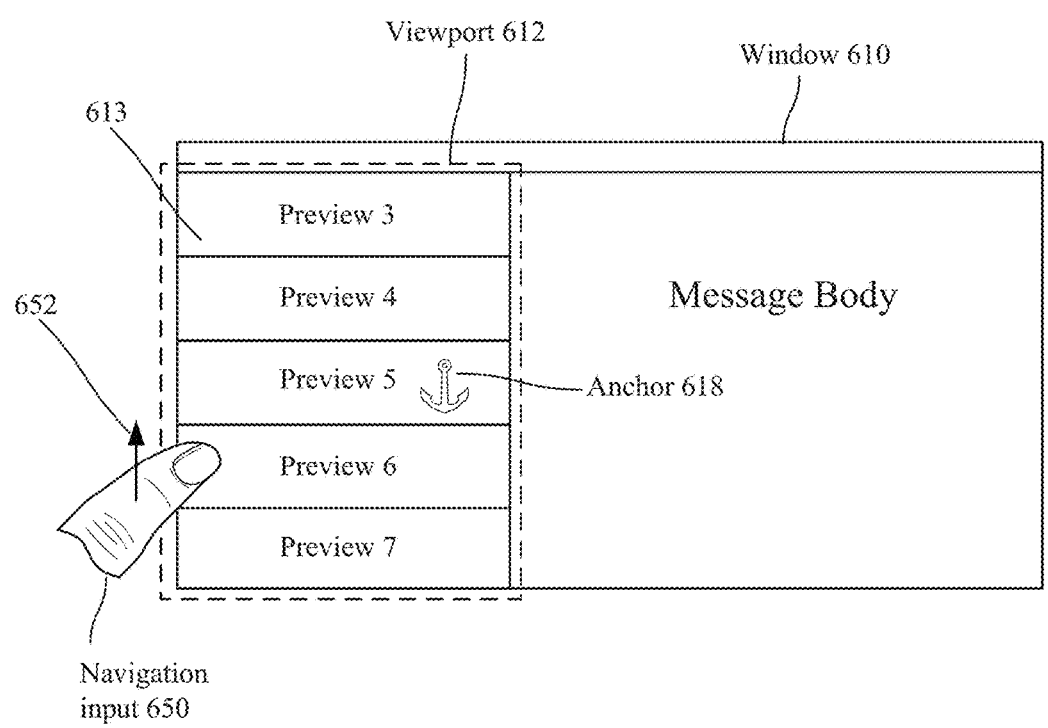

FIG. 6D depicts user navigation input 650 of content displayed within viewport 612. The direction of arrow 652 indicates that the input is an upward movement (e.g., an upward swipe gesture detected on a touch-sensitive surface, selection of an up arrow, selection of a page up button on a keyboard, or rotation of a knob or wheel that corresponds to scrolling the content within the viewport). In order to determine the resulting movement of anchor 618 (if any), in some embodiments, the magnitude of navigation input 650 is converted into a unit of measure suitable for determining on-screen placement of content. For example, the magnitude of navigation input 650 is converted into pixels, and added to the initial pixel position of anchor 618, to determine if a new position for anchor 618 is needed responsive to input 650.

In some embodiments, navigational inputs of large magnitude are handled differently than those of small magnitude. The determination of whether a user has scrolled the content of a viewport by a "large" amount can be made by converting the magnitude of a navigational input into a unit of measure (e.g., pixels) that can be compared with the size (e.g., height in pixels) of the viewport. In some embodiments, an input magnitude is considered large if it exceeds some multiple of the size of the viewport (e.g., 1×, 2×, 3× the height of viewport 612). In some embodiments, an input magnitude is considered large if it exceeds a threshold number of pixels (e.g., 768, 800, 1024, 1200 pixels).

Figure 6E:
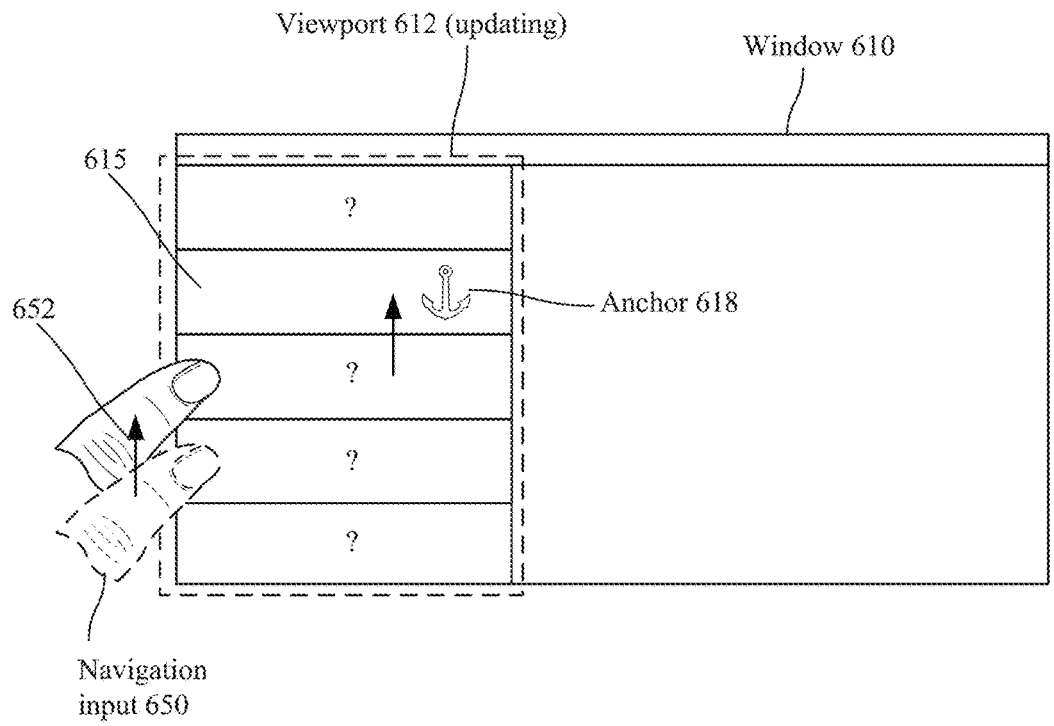
Figure 6E:
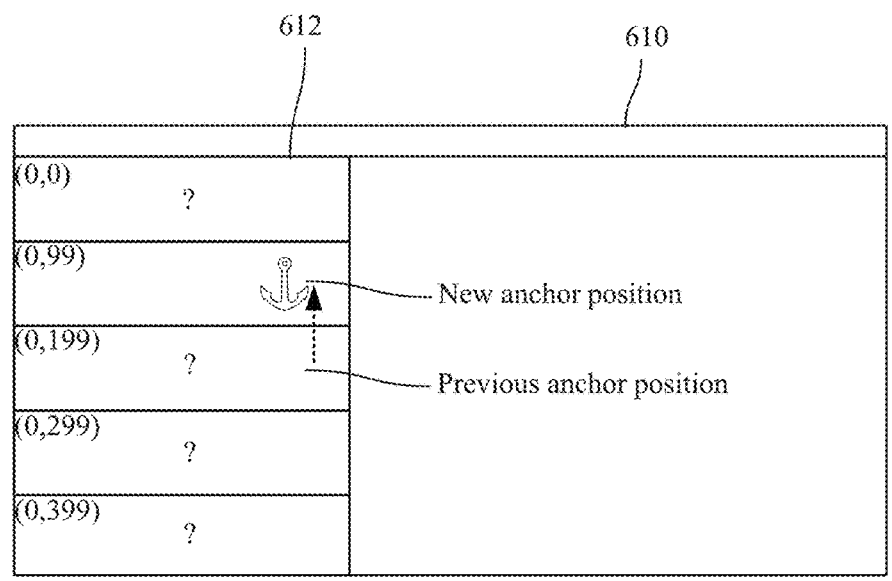
Figure 6F:
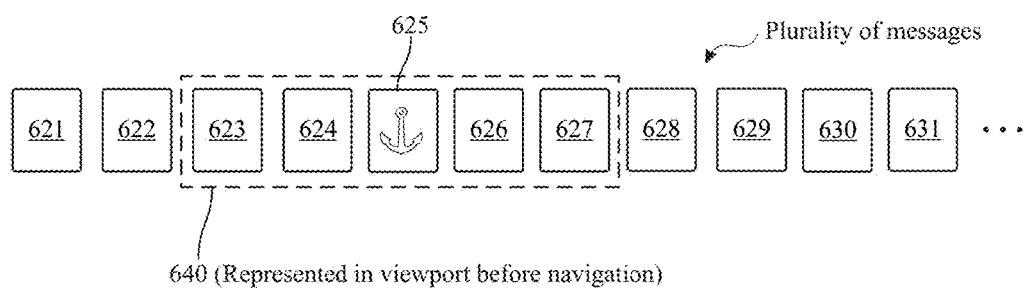

FIG. 6E illustrates a method of laying out display content using an anchor in response to an input of smaller magnitude. In some embodiments, when dealing with small navigational movements, actual information (e.g., dimension in pixels) regarding the graphical representations that are to be displayed data objects are used to configure the layout of graphical representations. The use of actual information in this instance is still computationally efficient because, under the anchored scrolling techniques described below, small navigational movements require a proportionately small amount of computation.

Figure 6G:
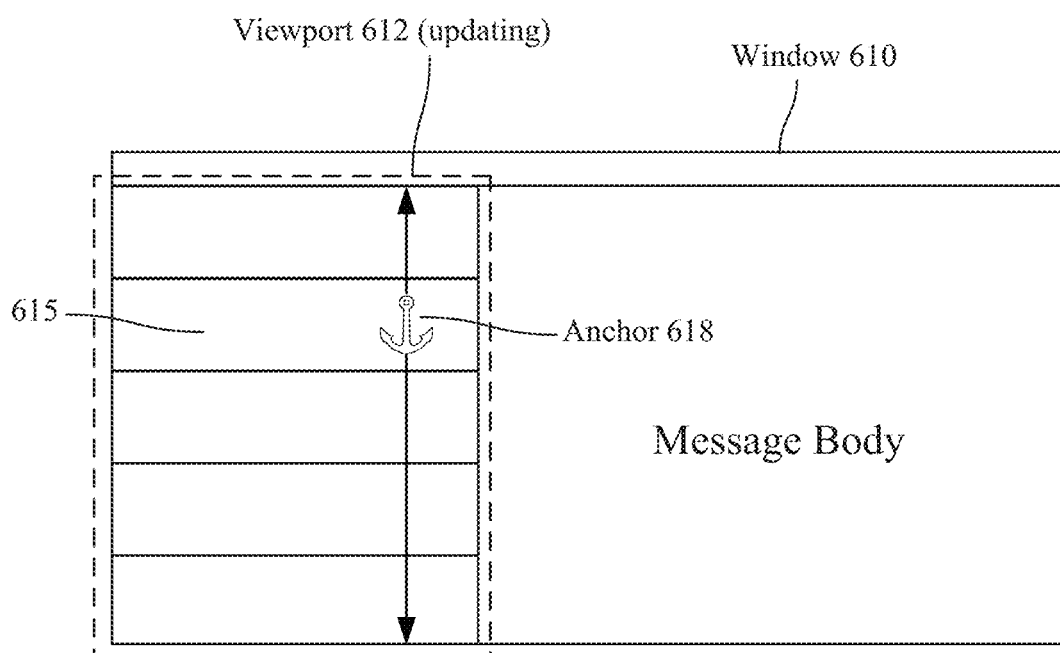

Consider the situation in which anchor 618 is initially placed at a vertical position defined by y=199 pixels. In response to an upward swipe corresponding to 100 pixels in magnitude, anchor 618 moves to a new vertical position of y=99 pixels. Once the new position of anchor 618 is determined, content that should be displayed in viewport 612 is identified. Recall that, as discussed above and as and illustrated in FIG. 6F, anchor 618 was associated with underlying e-mail message 625 prior to navigation input 650. After navigation user input 650, anchor 618 remains associated with e-mail message 625, even if the on-screen position of anchor 618 has changed. Due to this continuing relationship between anchor 618 and e-mail message 625, a preview region for e-mail message 625 can be earmarked for displayed at the new on-screen position corresponding to anchor 618. That is, as can be seen in FIG. 6G, preview region 615 corresponding to email message 625 becomes configured for display approximately 100 pixels above its previous display position, moving from the third row to the second row position within viewport 612. (Note that the actual on-screen display of preview region 615 may be withheld, in some embodiments, until the layout of content to be displayed in viewport 612 is complete.)

From the new position of anchor 618, additional content for display can be laid out by identifying display content in an outward manner from anchor 618 towards the top and the bottom boundaries of viewport 612. For instance, viewport 612 may determine that a number of pixels are available for displaying graphical representations above and below preview region 615 associated with anchor 618.

In some embodiments, to determine the exact number of preview regions that may be fitted above and below anchor 618 (corresponding to preview region 615), device 600 determines the actual sizes of adjacent preview regions that could be included in the display layout. For example, viewport 612 may process the markup language contained in e-mail message 624 (abutting message 625 which is also associated with the anchor) and determine that a preview region for message 624 would be of a pixel height that occupies all of the available pixels between the top of viewport 612 and anchor 618 (preview region 615). In this example, a preview region for just message 624 will be included in the layout of viewport 612, above anchor 618.

Device 600 also can layout preview regions below anchor 618. For example, this can be done by at least partially rendering messages 626-628, beginning with message 626, to determine a display height associated with the preview of each message. After calculating the preview heights for messages 626-628, device 600 may determine that the display of previews for these messages would occupy all of the available space between anchor 618 (preview region 615) and the bottom of viewport 612. In this example, preview regions for just messages 626-628 will be included in the layout of viewport 612, below anchor 618.

In some embodiments, to determine the exact number of preview regions that can be fitted above and below the anchor (preview region 615), device 600 obtains sizing information of relevant preview regions from a memory location. In these embodiments, an upstream process (such as the operating system) has pre-determined the sizes of graphical represents (e.g., preview regions) of underlying data objects and saved the sizing information into an accessible memory location.

After the preview regions (e.g., graphical representations) that are to be displayed in response navigation input 650 have been laid out, device 600 may display the preview regions in viewport 612 according to the layout. In some embodiments, device 600 holds off on the on-screen display of any one of the graphical representations that are to be displayed, until a layout of all of the representations to be displayed is complete. In some embodiments, device 600 begins to display certain graphical representations after some portions of the layout have been configured.

Figure 6H:
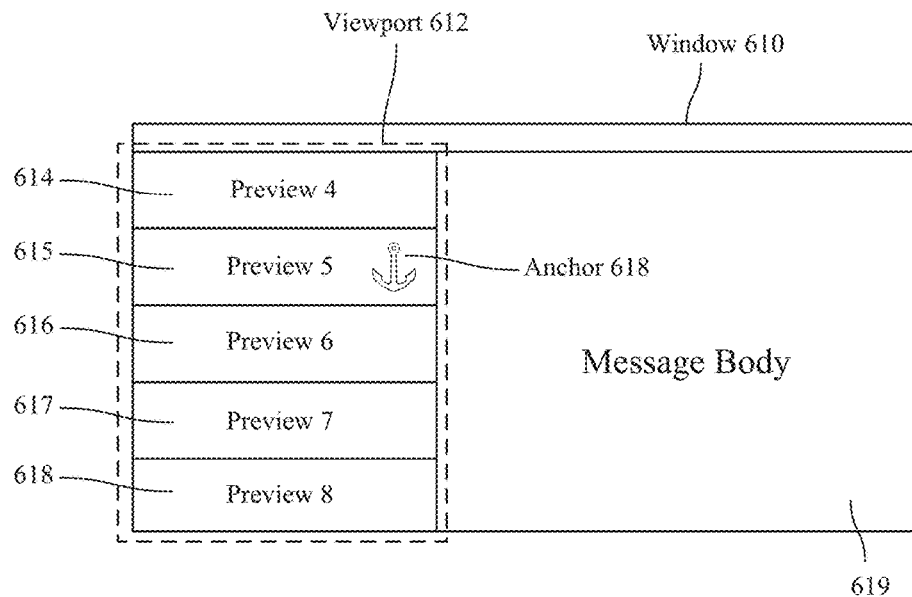
Figure 6H:
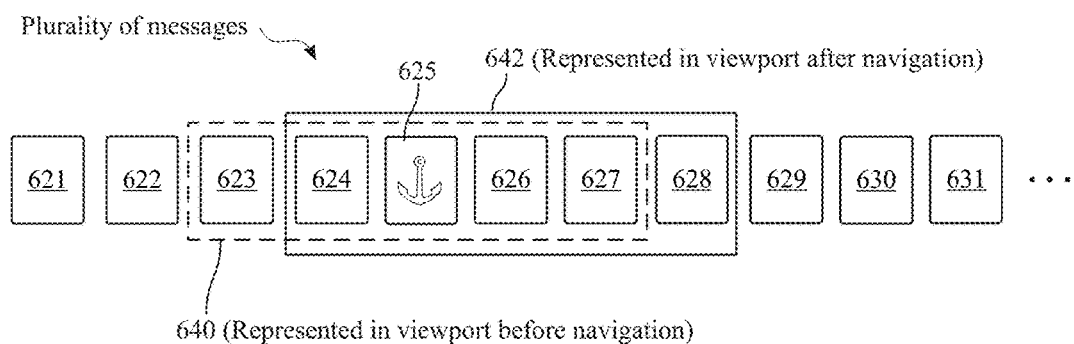

As shown in FIG. 6H, this result of the processing described with respect to FIGS. 6B-6G has the effect of scrolling viewport 612 by one row of information. That is, whereas viewport 612 displayed previews of messages within rectangle 640 before navigation input 650, after navigation input 650, viewport 612 updates to display previews of messages within rectangle 642. Indeed, this shift is consistent with user expectation as the user's navigation input 650 has a relatively small magnitude that roughly translates to the display height of one displayed preview region.

Importantly, the layout techniques described with reference to FIGS. 6B-6H do not impose significant burden on modern computer processors because the techniques did not involve calculating display heights of messages previews from a top-most or bottom-most e-mail message. Rather, the calculations described with respect to FIG. 6G originated from anchor 618 and radiated outwards to the boundaries of viewport 612. This technique is advantageous, in that the calculation of display heights of message previews from a top-most or bottom-most e-mail message could be computationally expensive if viewport 612 is positioned in the middle of a large set of e-mail messages, meaning that a large number of calculations must be performed before reaching those slated for preview in viewport 612. Instead, the techniques described herein for laying out content is based on a limited set of calculations originating from anchor 618 towards the top and bottom of viewport 612. In this way, viewport 612 is able to refresh quickly in response to user input by incurring a reduced number of computations that is proportional to the size of viewport 612. As can be appreciated, this technique brings significant efficiency when the number of data objects (e.g., e-mail messages) represented in viewport 612 is a small subset of the total number of available data objects (e.g., e-mail messages in a large mail folder).

Figure 7A:
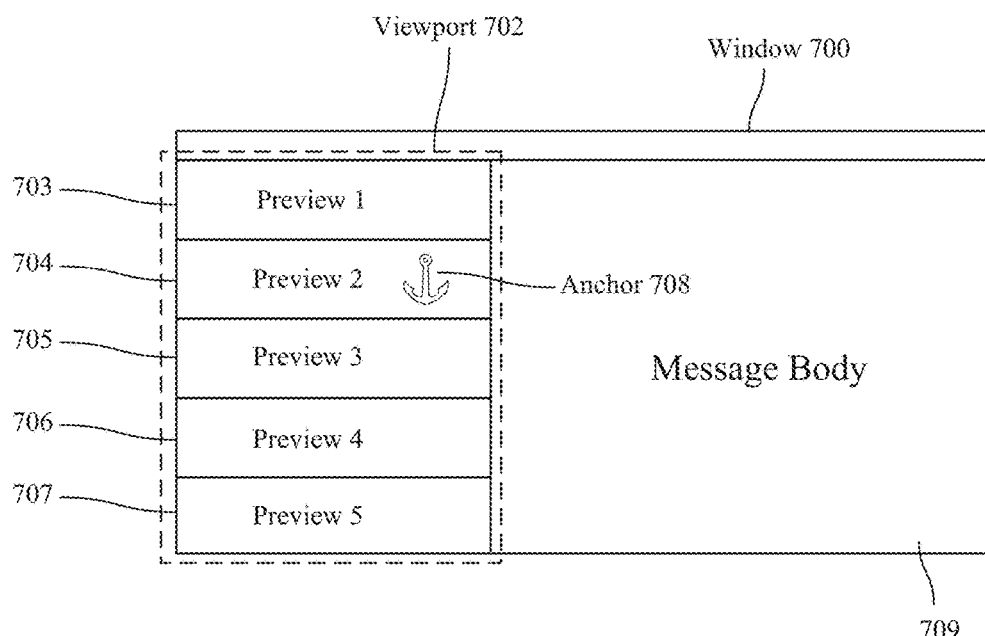
FIGS. 7A-7J illustrate an exemplary embodiment of techniques for configuring the layout of graphical representations of data objects, in response to user input.

Attention is now directed to another exemplary technique for laying out data objects in a viewport in response to user input, with reference to FIGS. 7A-7J. This technique is particularly applicable to laying out display content in response to an input of larger magnitude. FIG. 7A illustrates exemplary application window 700, which may be window 602 (FIG. 6A) in some embodiments, meaning that window 700 may be part of an active e-mail application running on device 600 (FIG. 6A). Window 700 has viewport 702 showing message preview regions 703-707. Window 700 also has region 709 for displaying the body of a selected message. In the illustrated example, an anchor 708 is associated with preview region 704.

Figure 7B:
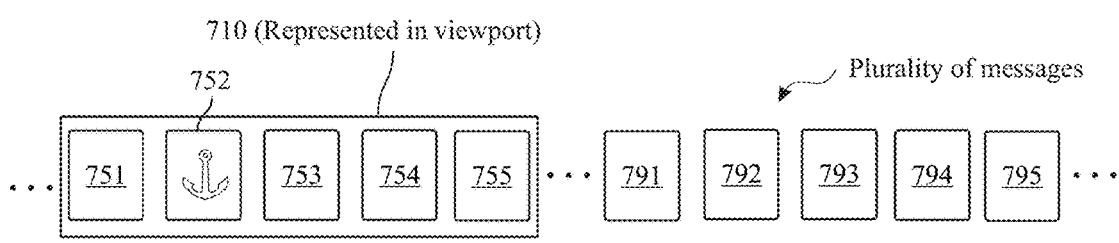

FIG. 7B illustrates the correspondence between preview regions 703-707 and underlying e-mail messages that are accessible to the e-mail application. Specifically, the e-mail application may have access to at least messages 751-795 depicted via FIG. 7B. As before, for brevity and clarity, the figure illustrates only a subset of the possible number of messages that can be processed by the e-mail application. It should be understood that a large number of e-mail messages can be visually represented in viewport 702. Rectangle 710 identifies messages 751-755 as those being previewed in viewport 702 (FIG. 7A), meaning that preview region 703 partially shows message 751, preview region 704 partially shows message 752, so forth.

Figure 7C:
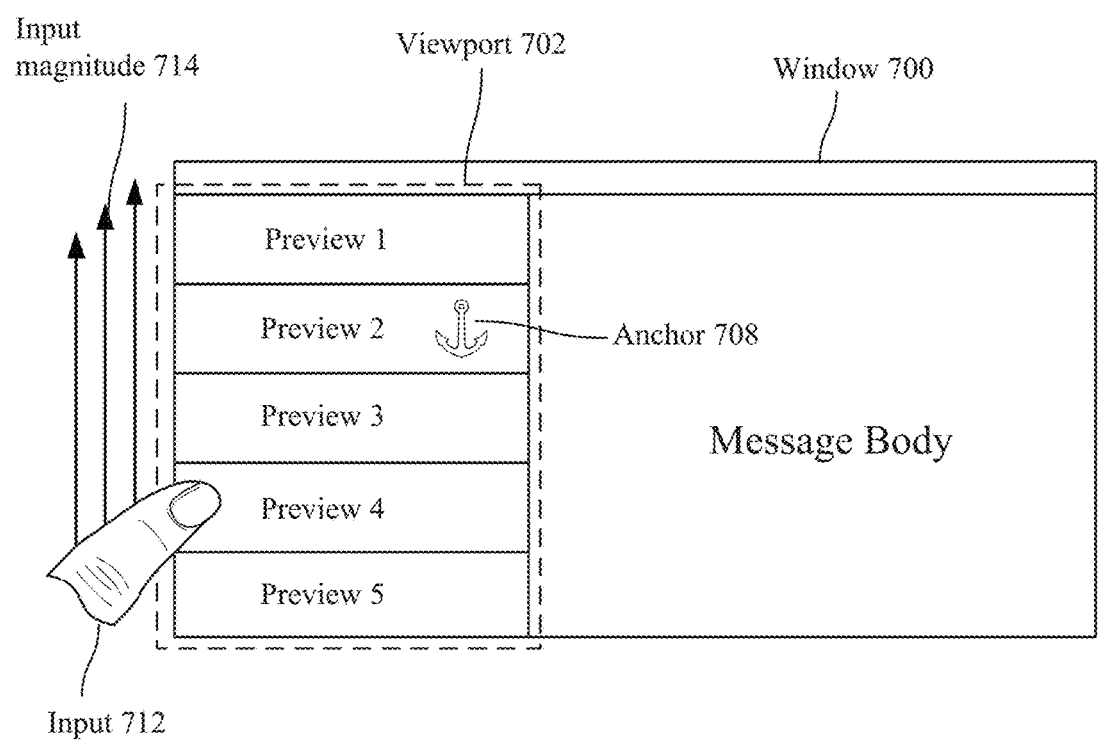

Turning to FIG. 7C, user navigation input 712 to content within viewport 702 is received. Input 712 includes multiple upward swipes as indicated by arrows 714. The number and lengths of arrows 714 indicate the magnitude of the user input: the user has scrolled by a much larger amount than as depicted above in the examples of FIGS. 6D-6I.

In response to navigational input of a large magnitude, device 600 may identify a new anchor for purposes of layout out updated content, instead of tracking anchor 708 through the entire movement corresponding to the input magnitude. Further, the positioning of the new anchor can involve some approximation in order to reduce computational cost. The use of an approximation without impacting user experience negatively is possible for at least two reasons. First, when on-screen object movement spans a large distance and/or occurs at a fast rate, users are unable to judge whether the actual movement tracks navigational input, pixel for pixel. Restated, as the user cannot discern the approximate positioning, the approximation itself would not distract from the user's experience.

Second, under the layout techniques described above with respect to FIG. 6G (particularly in terms of radiating outward from an anchor), "errors" in the approximation become inconsequential if a viewport accepts the approximated anchor position as a source of truth, and lays out content based on the accepted approximation. This is the case because the laying out of content originating from an on-screen position can occur in the same way regardless of whether the position originated from an estimated anchor or a precisely calculated anchor. So as long as the (approximated) positioning of an anchor is agreeable to the user (who cannot tell the difference), content may be laid out correctly within viewport 702 without introducing further errors into the displayed content.

This outcome stands in contrast to and is advantageous to techniques relying on the top-most or bottom-most data object for configuring on-screen layout of data objects, as errors introduced under those techniques accumulate and are exacerbated by each additional incoming data object. Consider the situation in which, instead of relying on an anchor, a display layout is determined based on the approximated display height of the X most recently received data objects (e.g., messages). As additional data object(s) X+1 (e.g., a message) is received, the overall approximation is revised to account for the additional (approximated) height of the newly received object, thereby adding to the uncertainly of the overall approximation from which display content is to be determined. The resolution of these errors is computationally expensive, particularly if a large number of intervening data objects exist between the current display position of a viewport and a first or last of the underlying data objects that is being represented in the viewport. Left in place, however, errors in the approximations manifest on-screen as sudden jarring movements of displayed content, which distracts from the user experience.

Figure 7D:
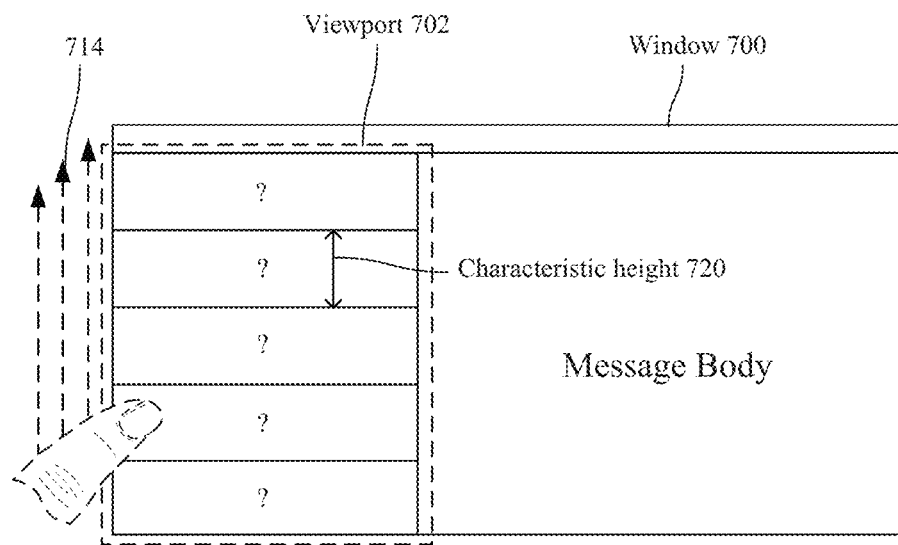
Figure 7E:
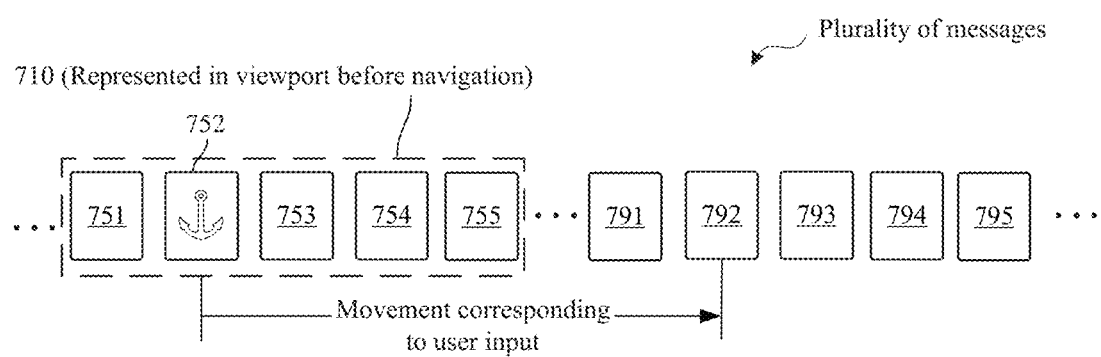
Figure 7F:
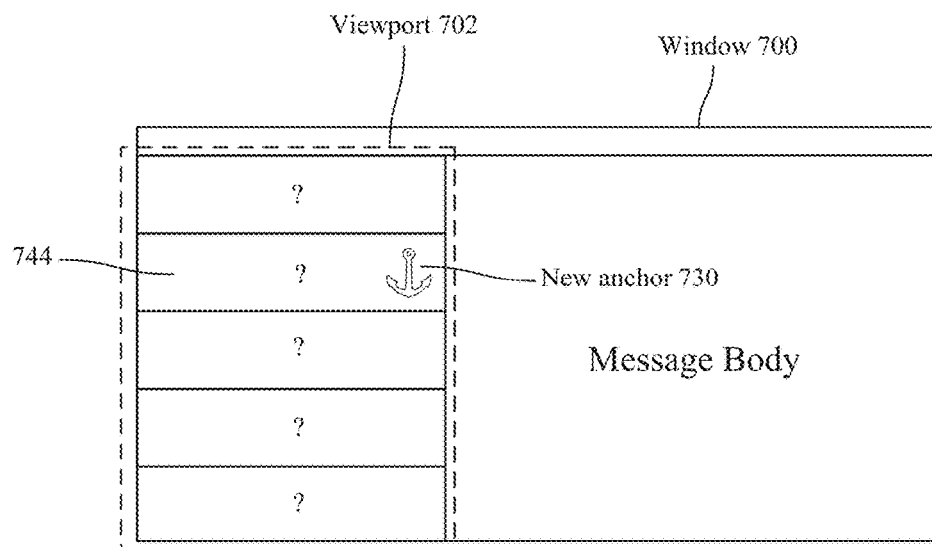
Figure 7G:
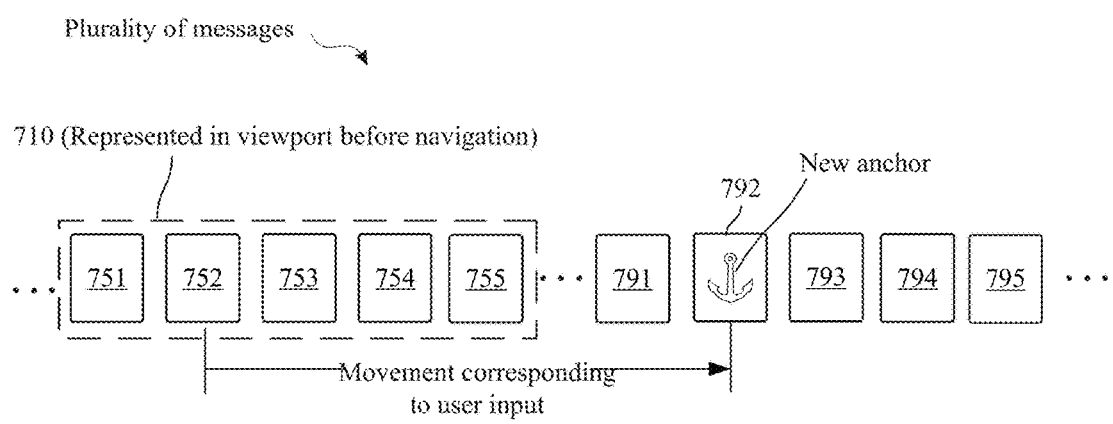

Attention is now directed to a method for approximating a new anchor in response to user input with reference to FIGS. 7D-7F. FIG. 7D illustrates that preview regions in viewport 702 may have a characteristic size (e.g., height in terms of pixels). As used here, "characteristic size" refers to an approximation of display size that may be based on the average size of graphical representations for the type of data objects being displayed (or some predetermined approximate size that is selected by the user or set by the application developer). For example, a user interface designer may calculate that the amount of (vertical) pixels used to display the sender and the initial twenty words of an e-mail using particular type fonts, on average, requires 80 pixels of display area, vertically. As another example, an application designer may set forth application-specific constraints—such as each message preview showing only one line of sender information, one line of subject information, and a maximum of two lines of message body—which has the effect of constraining message previews within a deterministic range of pixel height, from which a characteristic height (e.g., a mean) can be determined.

In some embodiments, the magnitude of input 712 is converted into an appropriate unit of measure and divided against the characteristic size of the preview regions of viewport 702 to determine a number of preview regions that should be traversed in response to the user input. For example, the magnitude of input 712 may be converted into pixels and divided against the characteristic height 720 (also in pixels) to approximate a number of preview regions that should be traversed in response to input 712.

Turning to FIG. 7E, the approximated number of preview regions to traverse is also used to determine the number of underlying e-mail messages that should be traversed. For example, if the magnitude of input 712 corresponds to scrolling over approximately 40 preview regions in viewport 702, then the input is also taken as removing the designation of message 752 as the anchor designating message 792 as the (new) anchor.

Turning to FIG. 7F, the graphical representation of message 792—preview region 744—also becomes associated with new anchor 730. Preview region 704 is no longer displayed in FIG. 7F as it is associated with anchor 708 which has scrolled off-screen. Instead, preview region 744, which is positioned forty positions after preview region 704, becomes configured for display. Note that preview region 744 is designated as the new anchor even though its identification involved approximations.

Figure 7H:
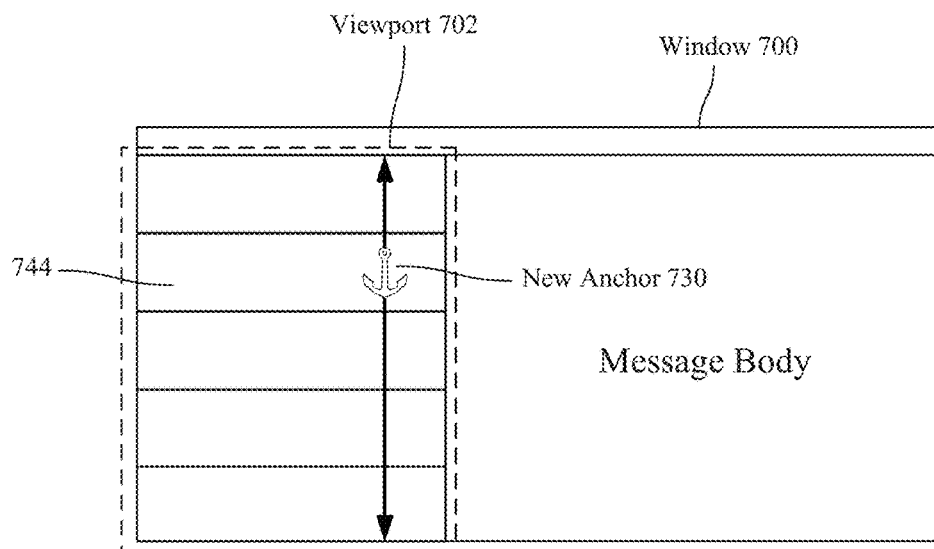
Figure 7I:
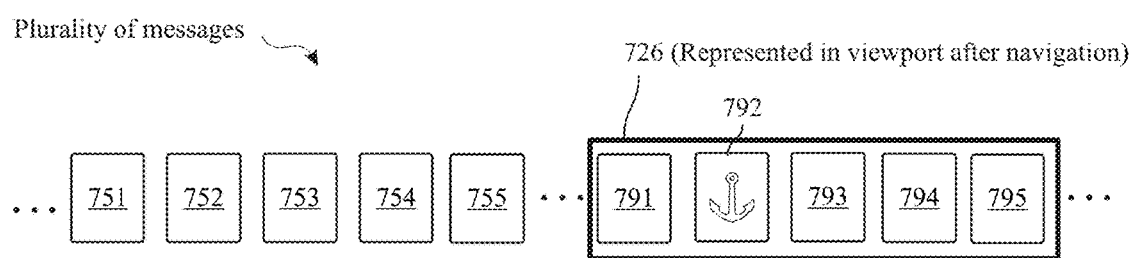
Figure 7J:
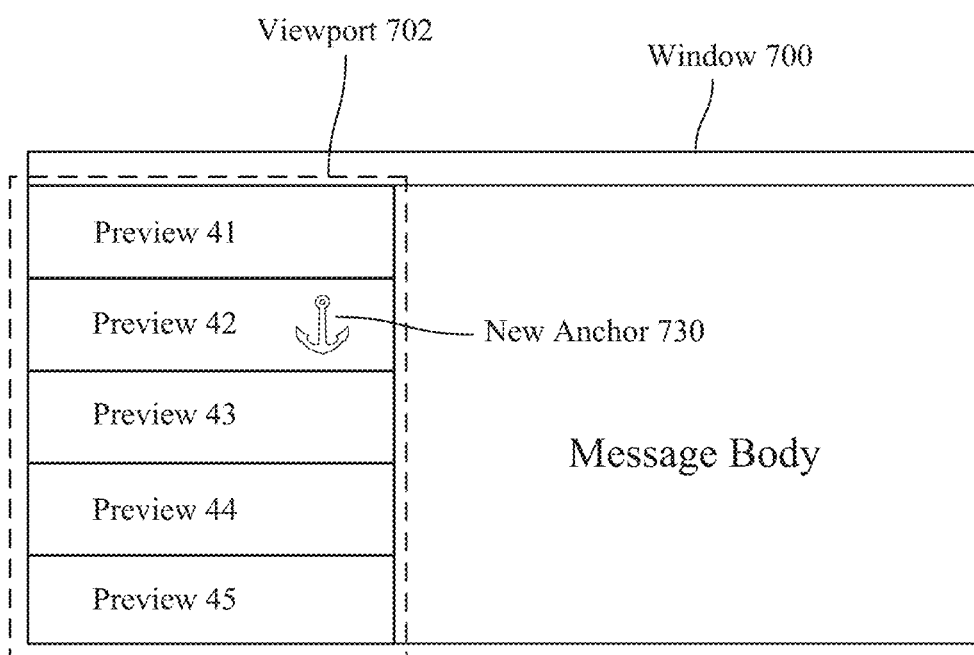

Turning to FIG. 7H, having determined new anchor 730, device 600 can determine the number of preview regions that could be laid out for display in viewport 702 above and below anchor 730 (preview region 744). Reading FIGS. 7H and 71 together, device 600 may determine that one preview region for message 791 fits into viewport 702 above anchor 730, and four preview regions corresponding to messages 793-795 fit in viewport 702 below anchor 730. Rectangle 726 thus identifies the e-mail messages that can be laid out for preview in viewport 702 according to a layout based on anchor 730. After determining this layout, device 600 may display the corresponding preview regions on-screen, as shown by FIG. 7J. In some embodiments, device 600 holds off on the on-screen display of any one of the graphical representations that are to be displayed, until a layout of all of the representations to be displayed is complete. In some embodiments, device 600 begins to display certain graphical representations after some portions of the layout have been configured.

Attention is now directed to the exemplary nature of FIGS. 6B-6H and FIGS. 7A-7J. Although the discussion of these figures concentrates on e-mail messages and previews of e-mail messages, it is noted that viewports can be used to scroll content other than previews of e-mail messages. In general, the above-described techniques can be implemented with any plurality of data objects that can be displayed in a viewport in an ordered fashion. The term "data objects" refer to objects accessible on a computing system, such as file system objects (e.g., folders, files including executable applications), application-specific objects (e.g., messages, photo thumbnails, bookmarks, rendered output from a structured document element), and so forth. It is also noted that the techniques described in FIGS. 6B-6H and 7A-7J are not mutually exclusive. Indeed, a given application may practice the techniques explained with reference to FIGS. 6B-6H under some circumstances (e.g., small magnitude of navigation input) and practice the techniques explained with reference to FIGS. 7A-7J under some circumstances (e.g., large magnitude of navigation input). Further, it is noted that an anchor need not be associated with a particular graphical representation (e.g., message preview). Rather, an anchor can be associated with a position before, after, or in-between an object (e.g., after the last message preview). An anchor can also be associated with an on-screen position such as a particular pixel location (0, 127). An anchor can also be defined to be "last displayed graphical representation, whatever that may be, is at 127px from the bottom of the screen". If data objects are added or removed at the end, this anchor will refer to whatever the new last data object and corresponding graphical representation is (as it does not correspond to a specific data object). Further still, it is noted that viewports are not limited to message preview panes in an e-mail application, but in general may be any scrollable window capable of displaying graphical representations of underlying data objects. For example, navigation screens within iTunes® and iPhoto®, and the Finder® aspect of MacOS® made by Apple, Inc. of Cupertino, Calif. constitute additional examples of viewports. Thus, the descriptions provided with respect to FIGS. 6B-6H and FIGS. 7A-7J should not be viewed as limited; rather, they should be viewed as enabling one of ordinary skill in the art to practice the described techniques across an array of graphical user interface elements and data objects.

2. Exemplary Processes for Laying-Out Data Objects

Figure 8:
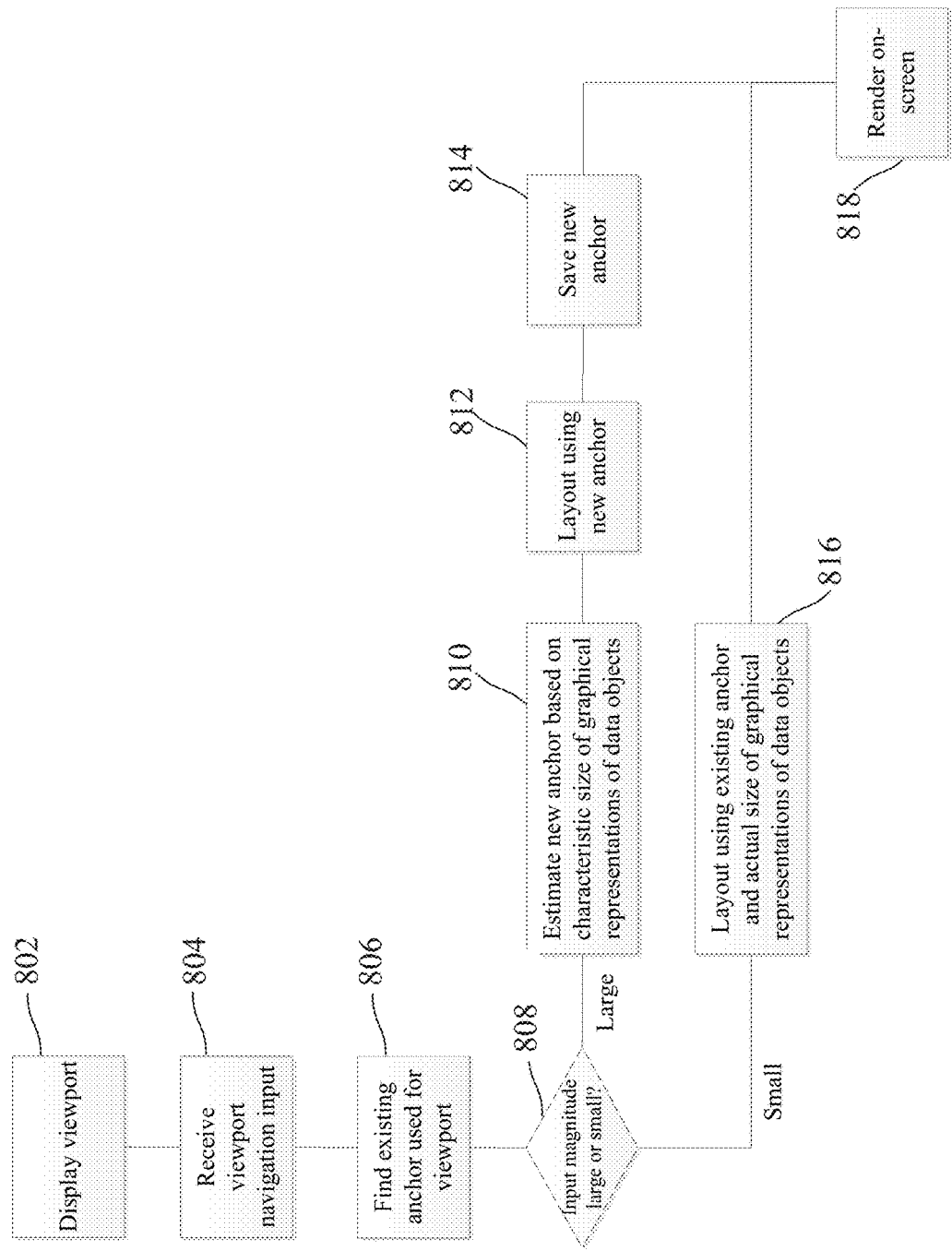
FIG. 8 is an exemplary flow diagram illustrating a process for configuring the layout of graphical representations of data objects.

FIG. 8 is a flow diagram illustrating exemplary process 800 for laying out data objects. Process 800 can be carried out by electronic devices such as devices 100 and/or 300 (FIG. 1A or 3A) in various embodiments. At block 802, the device displays a viewport having content in the form of graphical representations of a first subset of a plurality of data objects that are ordered. In the exemplary user interfaces discussed above with respect to FIGS. 6A-6H and 7A-7J, graphical representations are preview regions that partially display the content of corresponding e-mail messages. Other graphical representations may be used. For example, graphical representations in the form of icons and photo thumbnails are also possible. The displayed graphical representations and/or the plurality of data objects may be ordered based on meta-data associated with the data objects such as name, date, size, so forth.

At block 804, while displaying the graphical representations of the first subset of the plurality of data objects in the viewport, a request is received to navigate through graphical representations of the plurality of data objects in the viewport. For example, as discussed with reference to FIG. 6D, input 650 is received while viewport 612 displays graphical representations of e-mail messages. The request is associated with an input magnitude, which may be based on a distance and/or speed of a swipe or mouse input. The input magnitude also may be based on movement of a progress indicator such as a scroll bar. The input magnitude may also be based on a repetition of keyboard input (e.g., number and/or duration of directional-key key-presses).

At block 806, input magnitude corresponds to less than a threshold amount of movement of the graphical representations an anchor used to layout and display the viewport is identified. Such an anchor may be anchors 618 or 708 as discussed above with respect to FIGS. 6B and 7A. At block 808, a determination is made as to whether the magnitude of the received input corresponds to less than a threshold amount of movement of the graphical representations. The threshold amount may be based on a value such as a multiple of the size of the viewport (e.g., 1×, 2×, 3× the height of the viewport). The threshold amount also may be based on a number of pixels (e.g., 768, 800, 1024, 1200 pixels). As an example, a navigational input could be considered to exceed a threshold if the amount of scroll bar movement causes content within a viewport to scroll by more than three screens of content.

If the input magnitude exceeds the threshold amount, processing proceeds to blocks 810-814 where a layout of graphical representations of a second subset of data objects is generated by selecting a new anchor based on the input magnitude and generating a layout of graphical representations of the second subset of data objects based on that new anchor.

At block 810, the new anchor may be approximated by determining an approximate amount of movement through the plurality of data objects that corresponds to the input magnitude and selecting the second anchor based on the approximate amount of movement. The approximation may rely on a speed, length, or other characteristic of the input. Restated, the input from block 804 to scroll through the graphical representations of data objects is interpreted as an instruction to advance by some approximate number X of graphical representations and/or data objects, and not as an instruction to advance to a specific graphical representation or data object Y. The approximation may also rely on characteristic size of the graphical representations of the data objects. For example, the input magnitude may be converted to a number of pixels and compared against the characteristic height of a graphical representation to determine an approximate number of graphical representations to advance.

At block 812, a layout of graphical representations of the second plurality of data objects is configured based on the position of the new anchor. The configuration may be determined by "radiating out" from the new anchor, as described above with respect to FIG. 7H. At block 814, the new anchor is saved in memory for later retrieval, so that it may be used to process a subsequent scrolling input, for example.

Returning to decision block 808, if the input magnitude does not exceed the threshold amount, processing proceeds to blocks 816 where a layout of graphical representations of a second subset of data objects is generated based on the anchor obtained at block 806, and the magnitude of the input received at block 804. At block 816, the on-screen position of the graphical representation associated with the anchor may be moved by an amount corresponding to the input magnitude received at block 804. Once the on-screen of the anchor is determined, a layout of graphical representations can be generated by "radiating out" from the anchor as described above with respect to FIG. 6G.

The operations described above with reference to FIG. 8 are, optionally, implemented by components depicted in FIGS. 1A-1B, 3, and 9. For example, detection operation 802, receive operation 804, find operation 806, estimate operation 810, layout operations 812, 816, save operation 814, and render operation 818 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 3 and 9.

Figure 9:
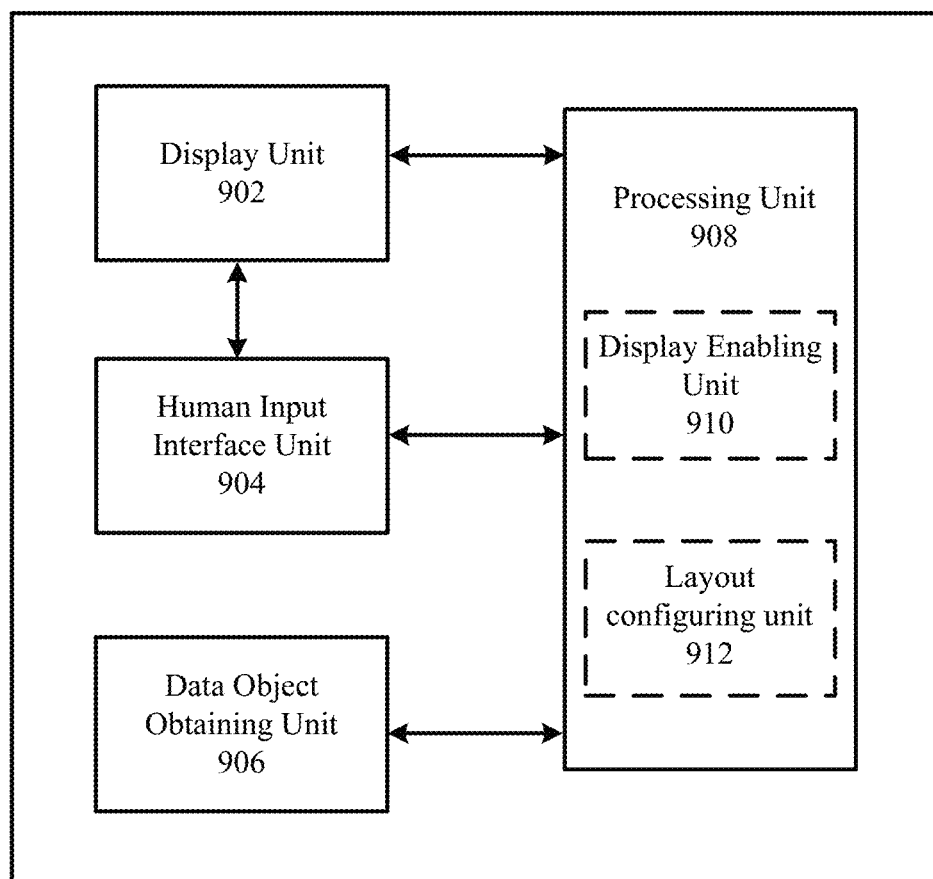
FIG. 9 is a functional block diagram of an electronic device configured to layout graphical representations of data objects in accordance with some embodiments.

FIG. 9 shows exemplary functional blocks of an electronic device 900 that, in some embodiments, performs the above-described features. As shown in FIG. 9, an electronic device 900 may include display unit 902 configured to display graphical objects; human input interface unit 904 configured to receive user input; data object obtaining unit 906 configured to obtain data objects; and processing unit 908 coupled to display unit 902, human input interface unit 904, and data object obtaining unit 906.

In some embodiments, data object obtaining unit 906 is configured to obtain data objects that are to be displayed by device 900. For example, data object obtaining unit 906 may obtain a message (e-mail, SMS messages, MMS messages, WiFi-based short messages), a file, an application, so forth. Data object obtaining unit 906 may be configured to obtain data objects from a local source, such as a local storage drive, or a networked source, such as a cloud-based storage service.

In some embodiments, processing unit 908 includes a display enabling unit 910 and a layout configuring unit 912. Display enabling unit 910 is configured to cause a display of a user interface (or portions of a user interface) in conjunction with the display unit 902. The displayed user interface may include one or more windows and/or viewports. A displayed viewport may contain graphical representations of data objects obtained by data object obtaining unit 906.

In some embodiments, human input interface unit 904 is configured to receive user interface navigation input while a viewport having graphical representations of data objects is displayed. Layout configuring unit 912 may receive data representing the navigation input from human input interface unit 904 and determine a new layout of graphical representations in a displayed viewport. In some embodiments, layout configuring unit is configured to perform the operations associated with blocks 810-816 of process 800 (FIG. 8). For example, layout configuration 912 can perform one or more of the following operations:

in accordance with a determination that the magnitude of input received by human input interface unit 904 corresponds to less than a threshold amount of movement of the graphical representations, generate layout of graphical representations of new content in the displayed viewport based on an existing anchor and the input magnitude;

in accordance with a determination that the input magnitude received by human input interface unit 904 corresponds to more than the threshold amount of movement of the graphical representations, selecting a new anchor based on the input magnitude and generating layout of graphical representations of new content in the displayed viewport based on the new anchor;

select a new anchor by determining an approximate amount of movement through the plurality of data objects that corresponds to the input magnitude;

determine an amount of viewport navigation corresponding to the input magnitude; identify at least one data object abutting the anchor within the ordered plurality of data objects; determine an actual size of one or more graphical representations of the at least one data objects abutting the existing anchor; and select one or more of the at least one data objects as new content to be displayed in the viewport, based on the actual size of the one or more graphical representations of the at least one data objects and the corresponding amount of viewport navigation;

obtain a characteristic size of graphical representations of the plurality of data objects; convert the input magnitude into a corresponding change in position within the order of the plurality of data objects based on the characteristic size of graphical representations of the plurality of data objects; and determine the new anchor using the position within the order of the plurality of data objects corresponding to the existing anchor, and the corresponding change in position.

In some embodiments, display enabling unit 910 and display unit 902 are configured to display the layout after layout configuring unit 912 has completed the layout.

The units of FIG. 9 may be used to implement the various techniques and methods described above with respect to FIGS. 6A-6H and 7A-7J. The units of device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. A non-transitory computer-readable storage medium storing one or more programs, the one or more programs comprising instructions, which when executed by an electronic device with a display, cause the device to:

display a viewport having content comprising graphical representations of a first subset of a plurality of data objects, wherein the data objects of the first subset are ordered, and wherein the first subset of data objects is associated with a first anchor;

while displaying the graphical representations of the first subset of the plurality of data objects in the viewport, receive a request to navigate through graphical representations of the plurality of data objects in the viewport, wherein the request is associated with an input magnitude; and in response to receiving the request:

in accordance with a determination that the input magnitude corresponds to less than a threshold amount of movement of the graphical representations, generate layout of graphical representations of a second subset of the plurality of data objects based on the first anchor and the input magnitude, and change the content of the viewport by displaying graphical representations of the data objects of the second subset according to the layout;

in accordance with a determination that the input magnitude corresponds to more than the threshold amount of movement of the graphical representations, select a second anchor based on the input magnitude, generate layout of graphical representations of a third subset of data objects based on the second anchor, and change the content of the viewport by displaying graphical representations of the data objects of the third subset according to the layout.

2. The non-transitory computer-readable storage medium of claim 1, wherein the instructions to cause the device to select the second anchor comprise instructions to cause the device to:

determine an approximate amount of movement through the plurality of data objects that corresponds to the input magnitude and select the second anchor based on the approximate amount of movement.

3. The non-transitory computer-readable storage medium of claim 1, wherein the first subset of data objects overlaps at least partly with the second subset of data objects.

4. The non-transitory computer-readable storage medium of claim 1, wherein the instructions to cause the device to generate the layout of graphical representations of the second subset of data objects comprises instructions to cause the device to:

identify at least one data object of the plurality of data objects positioned before the first or second anchor within the order of the plurality of data objects, and include the identified at least one data objects in the second subset.

5. The non-transitory computer-readable storage medium of claim 4, wherein the instructions to cause the device to generate layout of graphical representations of the second subset of data objects comprises instructions to cause the device to:

identify at least one data object of the plurality of data objects positioned after the first or second anchor within the order of the plurality of data objects, and include the identified at least one data objects in the second subset.

6. The non-transitory computer-readable storage medium of claim 4, wherein the instructions to cause the device to identify at least one data object of the plurality of data objects positioned before the first anchor or the second anchor within the order of the plurality of data objects comprises instructions to cause the device to:

determine a position, in the viewport, corresponding to the first or second anchor;

determine an amount of available display area, in the viewport, between the first anchor and a boundary of the viewport;

determine a number of graphical representations of data objects that can be displayed within the amount of available display area; and select a number of data objects positioned before the position corresponding to the first anchor as the identified at least one data objects, the number of data objects selected equaling the number of graphical representations determined as can be displayed within the amount of available display area.

7. The non-transitory computer-readable storage medium of claim 1, wherein the instructions to cause the device to select the same number of data objects comprises instructions to cause the device to:

select consecutive data objects positioned before the position corresponding to the first or second anchor.

8. The non-transitory computer-readable storage medium of claim 1, wherein the instructions to cause the device to generate a layout for a second subset of the plurality of data objects comprises instructions to cause the device to:

obtain a characteristic size of graphical representations of the plurality of data objects;

convert the input magnitude into a corresponding change in position within the order of the plurality of data objects based on the characteristic size of graphical representations of the plurality of data objects; and determine the second anchor using the position within the order of the plurality of data objects corresponding to the first anchor, and the corresponding change in position.

9. The non-transitory computer-readable storage medium of claim 1, wherein the instructions to cause the device to generate a layout for a second subset of the plurality of data objects comprises instructions to cause the device to:

determine an amount of viewport navigation corresponding to the input magnitude;

identify at least one data object abutting the first anchor within the ordered plurality of data objects;

determine an actual size of one or more graphical representations of the at least one data objects abutting the first anchor; and select one or more of the at least one data objects as the second subset based on the actual size of the one or more graphical representations of the at least one data objects and the corresponding amount of viewport navigation.

10. The non-transitory computer-readable storage medium of claim 1, wherein the threshold amount of movement is based on the size of the viewport.

11. The non-transitory computer-readable storage medium of claim 1, wherein the first anchor within the plurality of data objects was selected based on user input and corresponds to a data object of the plurality of data objects.

12. The non-transitory computer-readable storage medium of claim 1, wherein the first anchor within the plurality of data objects was selected based on user input and corresponds to a position before or after a data object of the plurality of data objects.

13. The non-transitory computer-readable storage medium of claim 1, wherein the first anchor within the plurality of data objects was selected based on user input and corresponds to a position in the content of the viewport.

14. The non-transitory computer-readable storage medium of claim 1, wherein the request to navigate through graphical representations of the plurality of data objects in the viewport comprises a request to scroll the content of the viewport.

15. The non-transitory computer-readable storage medium of claim 1, wherein the request to navigate through graphical representations of the plurality of data objects in the viewport comprises a request to resize the viewport.

16. The non-transitory computer-readable storage medium of claim 1, wherein the instructions to cause the device to change the content of the viewport comprise instructions to cause the device to change the content of the viewport after generating the layout for the second subset.

17. The non-transitory computer-readable storage medium of claim 1, wherein the plurality of data objects comprises files, and the viewport is a graphical user interface window.

18. The non-transitory computer-readable storage medium of claim 1, wherein the plurality of data objects comprises messages, and the viewport is a region displayed by a messaging application.

19. A method comprising:

at an electronic device configured to access a plurality of data objects:

displaying a viewport having content comprising graphical representations of a first subset of the plurality of data objects that are ordered, and wherein the first subset of data objects is associated with a first anchor;

while displaying the graphical representations of the first subset of the plurality of data objects in the viewport, receiving a request to navigate through graphical representations of the plurality of data objects in the viewport, wherein the request is associated with an input magnitude; and in response to receiving the request:

in accordance with a determination that the input magnitude corresponds to less than a threshold amount of movement of the graphical representations, generating layout of graphical representations of a second subset of the plurality of data objects based on the first anchor and the input magnitude, and changing the content of the viewport by displaying graphical representations of the data objects of the second subset according to the layout;

in accordance with a determination that the input magnitude corresponds to more than the threshold amount of movement of the graphical representations, selecting a second anchor based on the input magnitude, generating layout of graphical representations of a third subset of data objects based on the second anchor, and changing the content of the viewport by displaying graphical representations of the data objects of the third subset according to the layout.

20. An electronic device, comprising:

a display;

a memory; and a processor coupled to the display and the memory, the processor configured to:

display a viewport having content comprising graphical representations of a first subset of a plurality of data objects, wherein the data objects of the first subset are ordered, and wherein the first subset of data objects is associated with a first anchor;

while displaying the graphical representations of the first subset of the plurality of data objects in the viewport, receive a request to navigate through graphical representations of the plurality of data objects in the viewport, wherein the request is associated with an input magnitude; and responsive to receiving the request:

in accordance with a determination that the input magnitude corresponds to less than a threshold amount of movement of the graphical representations, generate layout of graphical representations of a second subset of the plurality of data objects based on the first anchor and the input magnitude, and change the content of the viewport by displaying graphical representations of the data objects of the second subset according to the layout;

in accordance with a determination that the input magnitude corresponds to more than the threshold amount of movement of the graphical representations, select a second anchor based on the input magnitude, generate layout of graphical representations of the third subset of data objects based on the second anchor, and change the content of the viewport by displaying graphical representations of the data objects of the third subset according to the layout.

21. The method of claim 19, including:
determining an approximate amount of movement through the plurality of data objects that corresponds to the input magnitude and select the second anchor based on the approximate amount of movement.

22. The method of claim 19, wherein the first subset of data objects overlaps at least partly with the second subset of data objects.

23. The method of claim 19, including:
identifying at least one data object of the plurality of data objects positioned before the first or second anchor within the order of the plurality of data objects, and include the identified at least one data objects in the second subset.

24. The method of claim 23, including:
identifying at least one data object of the plurality of data objects positioned after the first or second anchor within the order of the plurality of data objects, and include the identified at least one data objects in the second subset.

25. The method of claim 23, including:
determining a position, in the viewport, corresponding to the first or second anchor;
determining an amount of available display area, in the viewport, between the first anchor and a boundary of the viewport;
determining a number of graphical representations of data objects that can be displayed within the amount of available display area; and
selecting a number of data objects positioned before the position corresponding to the first anchor as the identified at least one data objects, the number of data objects selected equaling the number of graphical representations determined as can be displayed within the amount of available display area.

26. The method of claim 19, including:
selecting consecutive data objects positioned before the position corresponding to the first or second anchor.

27. The method of claim 19, including:
obtaining a characteristic size of graphical representations of the plurality of data objects;
converting the input magnitude into a corresponding change in position within the order of the plurality of data objects based on the characteristic size of graphical representations of the plurality of data objects; and determining the second anchor using the position within the order of the plurality of data objects corresponding to the first anchor, and the corresponding change in position.

28. The method of claim 19, including:
determining an amount of viewport navigation corresponding to the input magnitude;
identifying at least one data object abutting the first anchor within the ordered plurality of data objects;
determining an actual size of one or more graphical representations of the at least one data objects abutting the first anchor; and
selecting one or more of the at least one data objects as the second subset based on the actual size of the one or more graphical representations of the at least one data objects and the corresponding amount of viewport navigation.

29. The method of claim 19, wherein the threshold amount of movement is based on the size of the viewport.

30. The method of claim 19, wherein the first anchor within the plurality of data objects was selected based on user input and corresponds to a data object of the plurality of data objects.

31. The method of claim 19, wherein the first anchor within the plurality of data objects was selected based on user input and corresponds to a position before or after a data object of the plurality of data objects.

32. The method of claim 19, wherein the first anchor within the plurality of data objects was selected based on user input and corresponds to a position in the content of the viewport.

33. The method of claim 19, wherein the request to navigate through graphical representations of the plurality of data objects in the viewport comprises a request to scroll the content of the viewport.

34. The method of claim 19, wherein the request to navigate through graphical representations of the plurality of data objects in the viewport comprises a request to resize the viewport.

35. The method of claim 19, including changing the content of the viewport after generating the layout for the second subset.

36. The method of claim 19, wherein the plurality of data objects comprises files, and the viewport is a graphical user interface window.

37. The method of claim 19, wherein the plurality of data objects comprises messages, and the viewport is a region displayed by a messaging application.

38. The electronic device according to claim 20, wherein the operations include:
determining an approximate amount of movement through the plurality of data objects that corresponds to the input magnitude and select the second anchor based on the approximate amount of movement.

39. The electronic device according to claim 20, wherein the first subset of data objects overlaps at least partly with the second subset of data objects.

40. The electronic device according to claim 21, wherein the operations include:
identifying at least one data object of the plurality of data objects positioned before the first or second anchor within the order of the plurality of data objects, and include the identified at least one data objects in the second subset.

41. The electronic device according to claim 40, wherein the operations include:

identifying at least one data object of the plurality of data objects positioned after the first or second anchor within the order of the plurality of data objects, and include the identified at least one data objects in the second subset.

42. The electronic device according to claim 40, wherein the operations include:
  determining a position, in the viewport, corresponding to the first or second anchor;
  determining an amount of available display area, in the viewport, between the first anchor and a boundary of the viewport;
  determining a number of graphical representations of data objects that can be displayed within the amount of available display area; and
  selecting a number of data objects positioned before the position corresponding to the first anchor as the identified at least one data objects, the number of data objects selected equaling the number of graphical representations determined as can be displayed within the amount of available display area.

43. The electronic device according to claim 20, wherein the operations include:
  selecting consecutive data objects positioned before the position corresponding to the first or second anchor.

44. The electronic device according to claim 20, wherein the operations include:
  obtaining a characteristic size of graphical representations of the plurality of data objects;
  converting the input magnitude into a corresponding change in position within the order of the plurality of data objects based on the characteristic size of graphical representations of the plurality of data objects; and
  determining the second anchor using the position within the order of the plurality of data objects corresponding to the first anchor, and the corresponding change in position.

45. The electronic device according to claim 20, wherein the operations include:
  determining an amount of viewport navigation corresponding to the input magnitude;
  identifying at least one data object abutting the first anchor within the ordered plurality of data objects;
  determining an actual size of one or more graphical representations of the at least one data objects abutting the first anchor; and
  selecting one or more of the at least one data objects as the second subset based on the actual size of the one or more graphical representations of the at least one data objects and the corresponding amount of viewport navigation.

46. The electronic device according to claim 20, wherein the threshold amount of movement is based on the size of the viewport.

47. The electronic device according to claim 20, wherein the first anchor within the plurality of data objects was selected based on user input and corresponds to a data object of the plurality of data objects.

48. The electronic device according to claim 20, wherein the first anchor within the plurality of data objects was selected based on user input and corresponds to a position before or after a data object of the plurality of data objects.

49. The electronic device according to claim 20, wherein the first anchor within the plurality of data objects was selected based on user input and corresponds to a position in the content of the viewport.

50. The electronic device according to claim 20, wherein the request to navigate through graphical representations of the plurality of data objects in the viewport comprises a request to scroll the content of the viewport.

51. The electronic device according to claim 20, wherein the request to navigate through graphical representations of the plurality of data objects in the viewport comprises a request to resize the viewport.

52. The electronic device according to claim 20, wherein the operations include changing the content of the viewport after generating the layout for the second subset.

53. The electronic device according to claim 20, wherein the plurality of data objects comprises files, and the viewport is a graphical user interface window.

54. The electronic device according claim 20, wherein the plurality of data objects comprises messages, and the viewport is a region displayed by a messaging application.

* * * * *

UNITED STATES PATENT AND TRADEMARK OFFICE
CERTIFICATE OF CORRECTION

PATENT NO. : 9,886,179 B2  
APPLICATION NO. : 14/503041  
DATED : February 6, 2018  
INVENTOR(S) : Alexis Allison Iskander Page 1 of 1

It is certified that error appears in the above-identified patent and that said Letters Patent is hereby corrected as shown below:

In the Claims

In Claim 40, Column 38, Line 59, delete "21," and insert -- 20, --, therefor.

In Claim 54, Column 40, Line 40, after "according" insert -- to --.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*